(12) United States Patent
Gunasekaran et al.

(10) Patent No.: US 12,523,116 B2
(45) Date of Patent: Jan. 13, 2026

(54) SAFETY VALVE INCLUDING FIRST, SECOND AND THIRD CONNECTED PORTIONS

(71) Applicant: Halliburton Energy Services, Inc., Houston, TX (US)

(72) Inventors: Mohan Gunasekaran, Al-Khobar (SA); Ibrahim El Mallawany, Al-Khobar (SA); David Allen Dockweiler, Singapore (SG); Michael Linley Fripp, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/984,461

(22) Filed: Dec. 17, 2024

(65) Prior Publication Data
US 2025/0207477 A1    Jun. 26, 2025

Related U.S. Application Data

(60) Provisional application No. 63/632,224, filed on Apr. 10, 2024, provisional application No. 63/616,026, (Continued)

(51) Int. Cl.
*E21B 34/06* (2006.01)
*E21B 34/14* (2006.01)
(Continued)

(52) U.S. Cl.
CPC ............ *E21B 34/066* (2013.01); *E21B 34/14* (2013.01); *F16K 31/0675* (2013.01); *F16K 31/084* (2013.01); *E21B 2200/05* (2020.05)

(58) Field of Classification Search
CPC .... E21B 34/066; E21B 34/14; E21B 2200/05; F16K 31/0675; F16K 31/084
See application file for complete search history.

(56) References Cited

U.S. PATENT DOCUMENTS

| 6,352,118 B1 | 3/2002 | Dickson et al. |
| 11,248,441 B2 | 2/2022 | Vick, Jr. et al. |

(Continued)

FOREIGN PATENT DOCUMENTS

| WO | 2020041056 A1 | 2/2020 |
| WO | 2020117187 A1 | 6/2020 |

*Primary Examiner* — Tara Schimpf
*Assistant Examiner* — Daniel T Craig
(74) *Attorney, Agent, or Firm* — Scott Richardson; Parker Justiss, P.C.

(57) ABSTRACT

Provided is a safety valve, a well system, and a method. The safety valve, in one aspect, includes a first portion, the first portion including a safety valve sub having a sliding sleeve, the first portion configured to be run-in-hole as part of wellbore tubing. The safety valve, in accordance with this aspect, further includes a second portion, the second portion configured to be run-in-hole after the first portion. The safety valve, in accordance with this aspect, further includes a third portion, the third portion including a mechanical connecting apparatus, the third portion configured to be run-in-hole after the second portion, the mechanical connecting apparatus configured to couple with the sliding sleeve of the first portion and the bore flow management actuator of the second portion to axially fix together the sliding sleeve and at least a portion of the bore flow management actuator.

28 Claims, 45 Drawing Sheets

Related U.S. Application Data filed on Dec. 29, 2023, provisional application No. 63/614,266, filed on Dec. 22, 2023, provisional application No. 63/614,231, filed on Dec. 22, 2023.

(51) Int. Cl.
*F16K 31/06* (2006.01)
*F16K 31/08* (2006.01)

(56) References Cited

U.S. PATENT DOCUMENTS

| | | |
|---|---|---|
| 2005/0056414 A1 | 3/2005 | Dennistoun et al. |
| 2006/0157240 A1 | 7/2006 | Shaw et al. |
| 2011/0240299 A1 | 10/2011 | Vick, Jr. et al. |
| 2013/0220624 A1 | 8/2013 | Hill, Jr. et al. |
| 2016/0265309 A1* | 9/2016 | Vick, Jr. ............. F16K 31/1221 |
| 2022/0341285 A1 | 10/2022 | Werkheiser et al. |
| 2023/0018892 A1 | 1/2023 | Chouzenoux et al. |
| 2025/0207493 A1* | 6/2025 | Gunasekaran ........ E21B 34/066 |

* cited by examiner

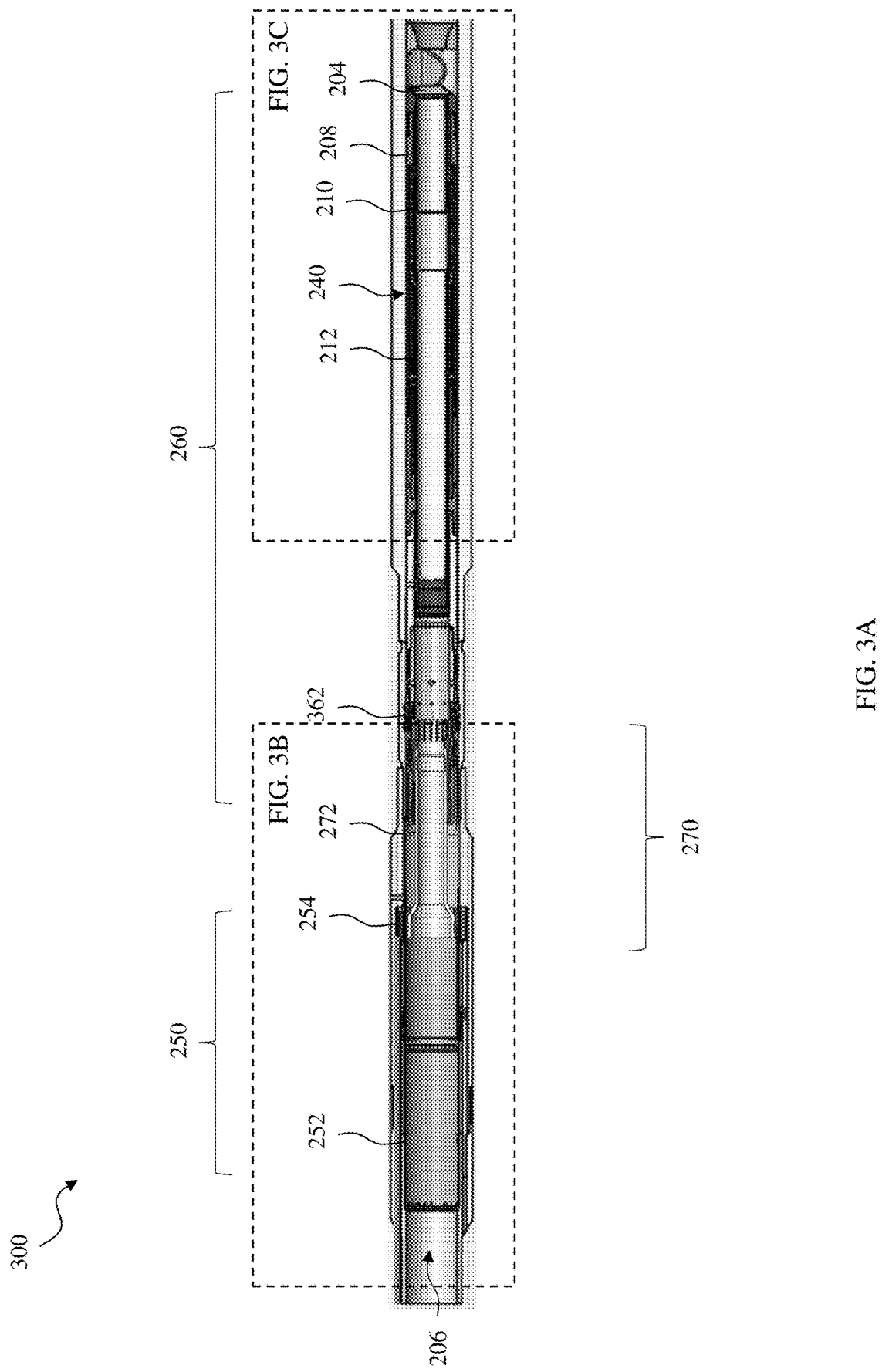

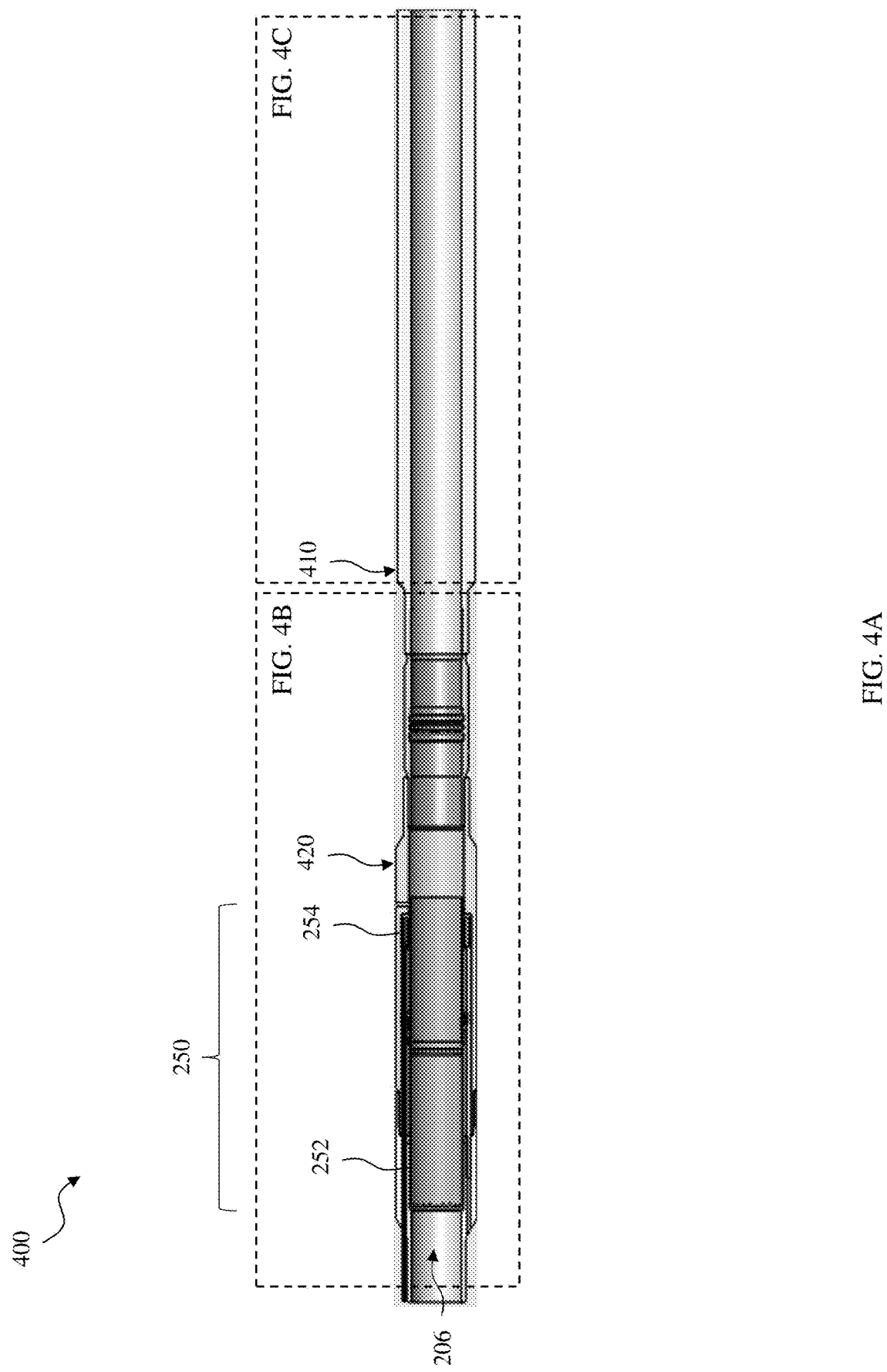

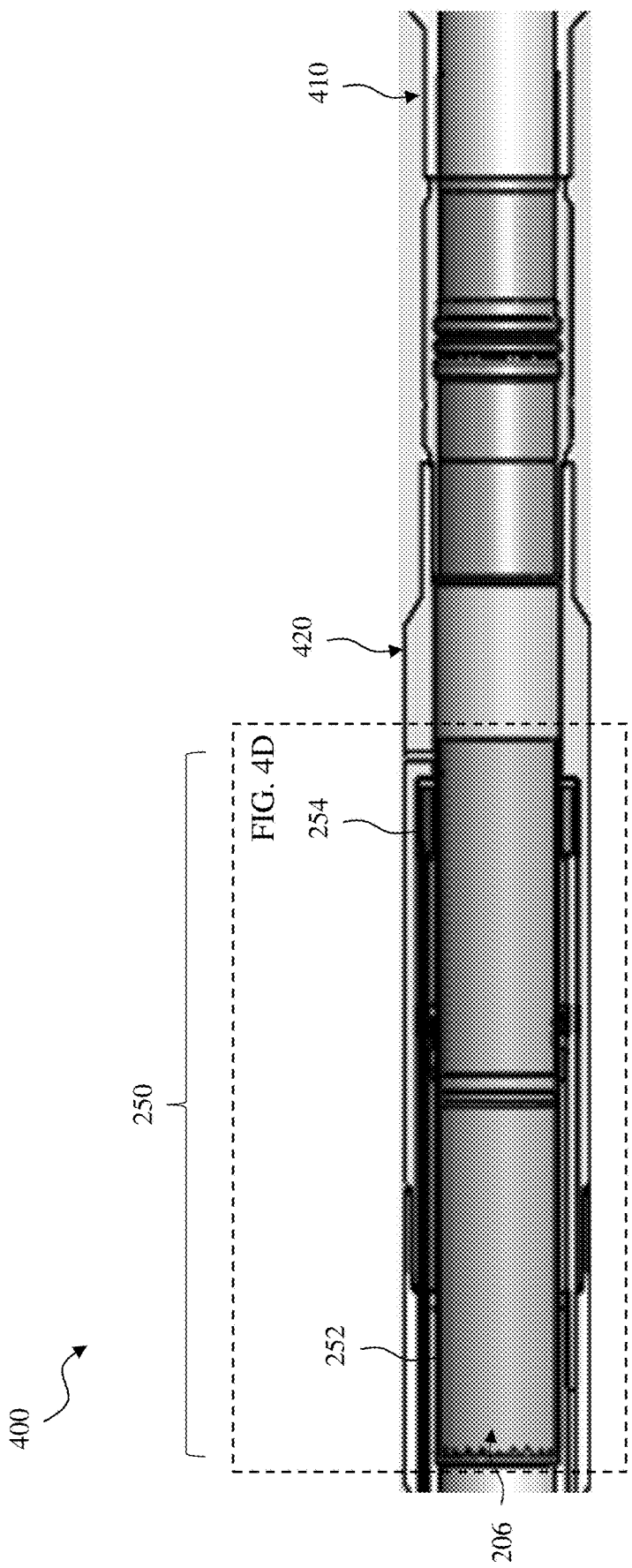

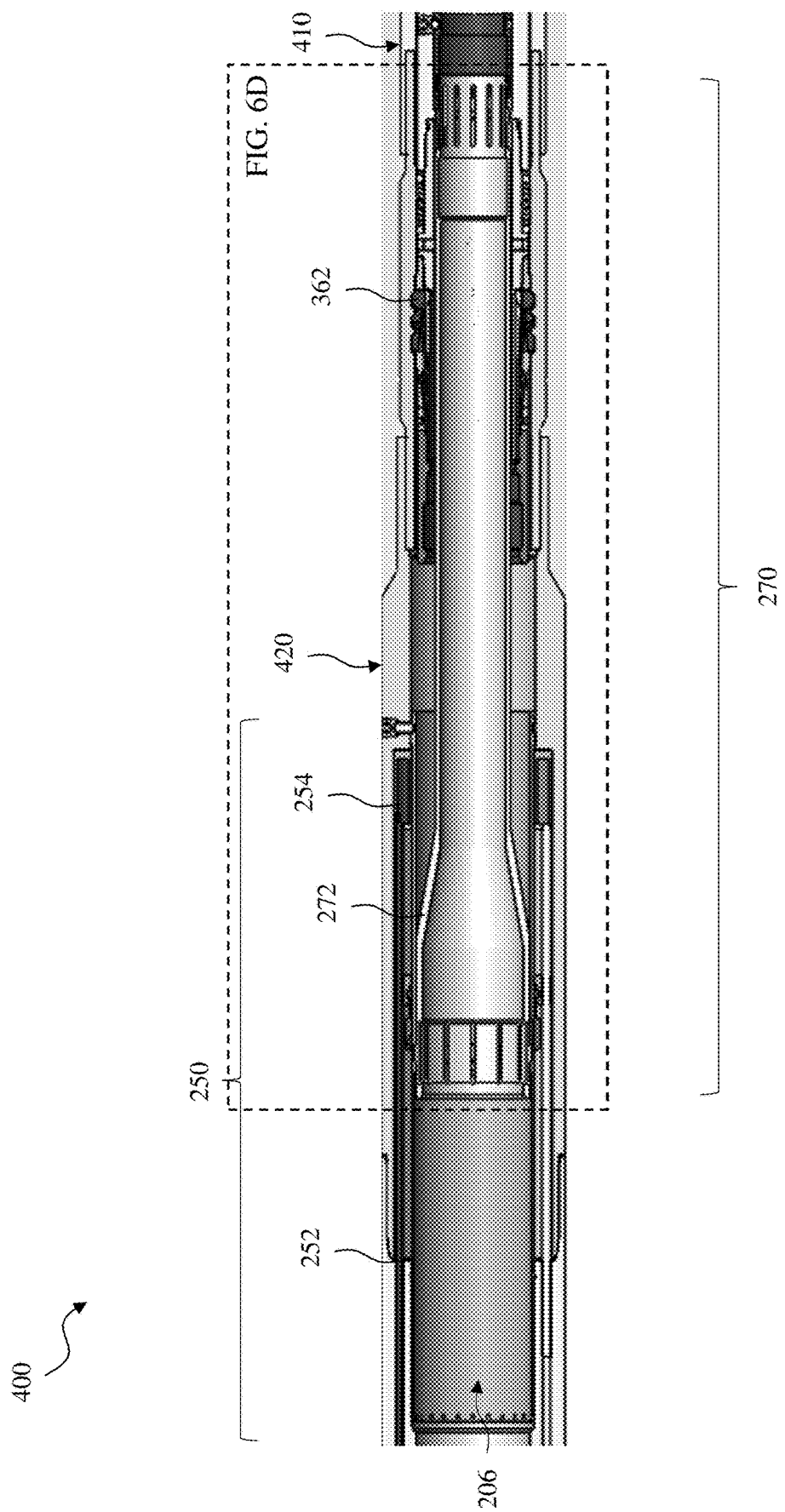

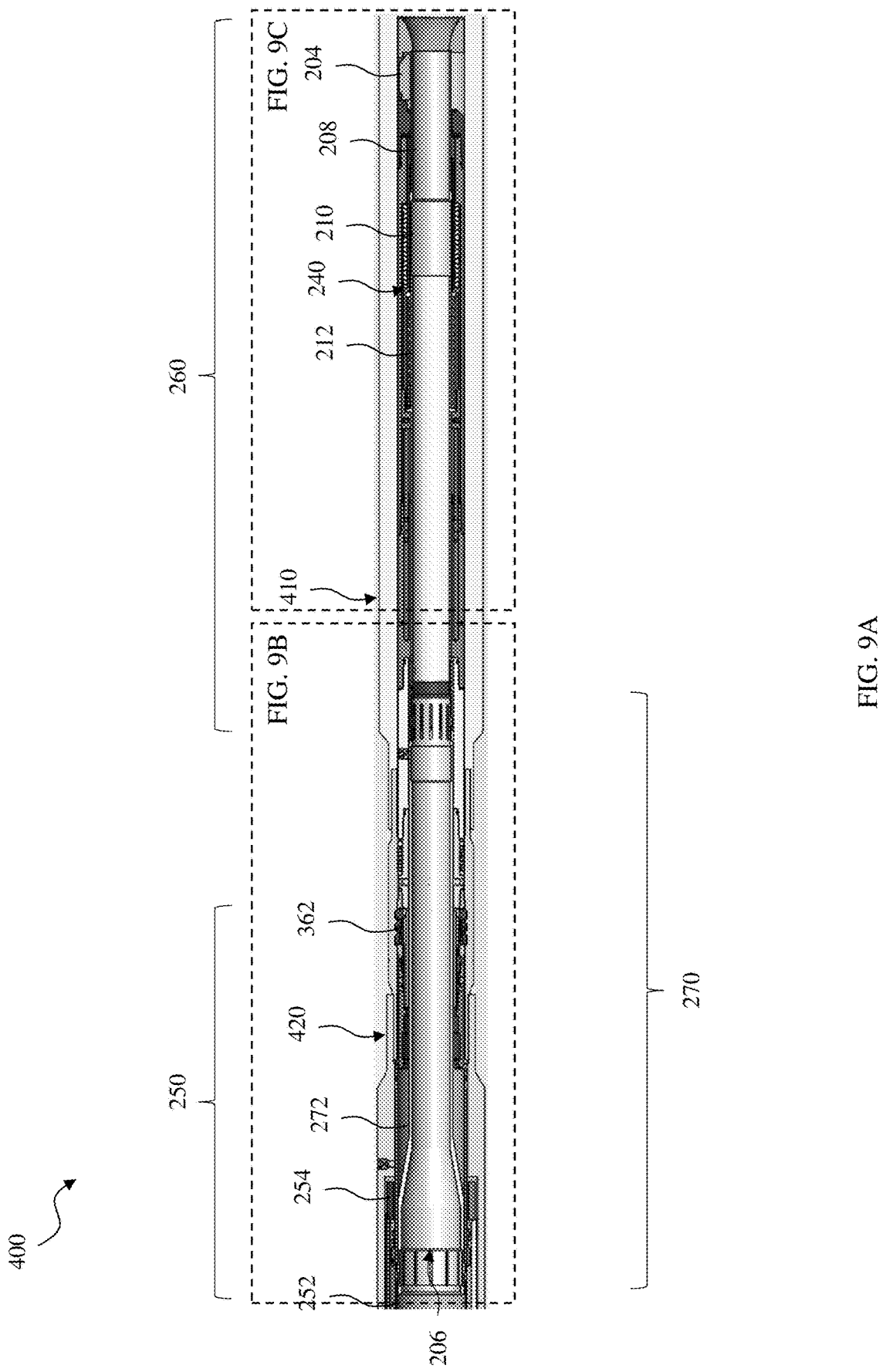

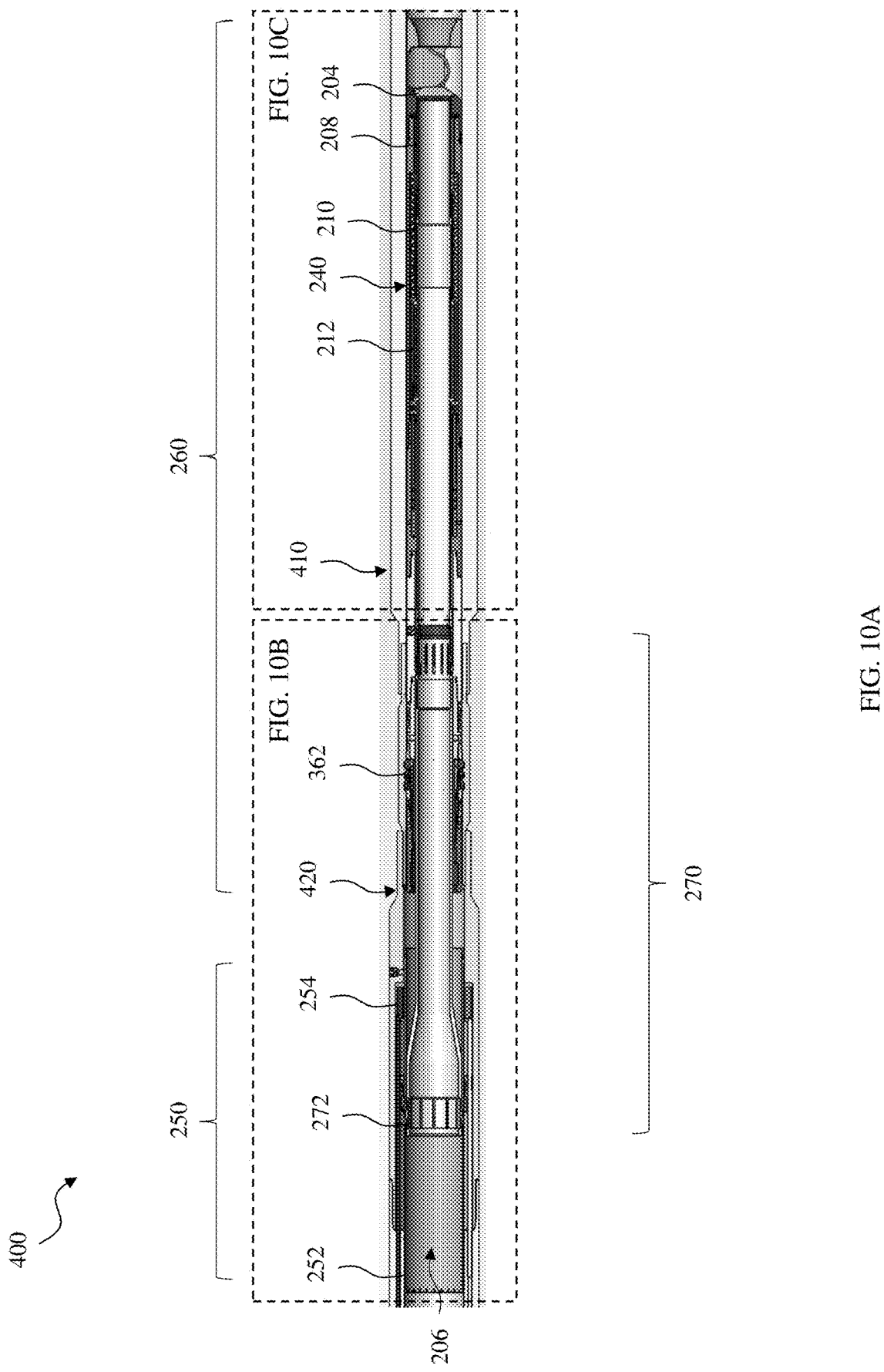

SAFETY VALVE INCLUDING FIRST, SECOND AND THIRD CONNECTED PORTIONS

CROSS-REFERENCE TO RELATED APPLICATION

This application claims the benefit of U.S. Provisional Application Ser. No. 63/614,266, filed on Dec. 22, 2023, entitled "WIRELINE RETRIEVABLE ELECTROMAGNETIC SAFETY VALVE," U.S. Provisional Application Ser. No. 63/614,231, filed on Dec. 22, 2023, entitled "METHODS TO PREDICT A HEALTH OF A SUBSURFACE SAFETY VALVE IN DOWNHOLE APPLICATIONS," U.S. Provisional Application Ser. No. 63/616,026, filed on Dec. 29, 2023, entitled "METHODS TO PREDICT A HEALTH OF A SUBSURFACE SAFETY VALVE IN DOWNHOLE APPLICATIONS," and U.S. Provisional Application Ser. No. 63/632,224, filed on Apr. 10, 2024, entitled "METHODS TO PREDICT A HEALTH OF A SUBSURFACE SAFETY VALVE IN DOWNHOLE APPLICATIONS USING ONE OR MORE MAGNETIC ANGLE SENSORS," all of which are commonly assigned with this application and incorporated herein by reference in their entirety.

BACKGROUND

Downhole devices, such as subsurface safety valves (SSSVs) are well known in the oil and gas industry and provide one of many failsafe mechanisms to prevent the uncontrolled release of subsurface production fluids, should a wellbore system experience a loss in containment. In certain instances, SSSVs comprise a portion of a tubing string, the entirety of the SSSVs being set in place during completion of a wellbore. In other instances, the SSSVs are wireline deployed/retrieved. Although a number of design variations are possible for SSSVs, the vast majority are flapper-type valves that open and close in response to longitudinal movement of a flow tube.

Since SSSVs typically provide a failsafe mechanism, the default positioning of the flapper valve is usually closed in order to minimize the potential for inadvertent release of subsurface production fluids. The flapper valve can be opened through various means of control from the earth's surface in order to provide a flow pathway for production to occur. What is needed in the art is an improved SSSV that does not encounter the problems of existing SSSVs.

BRIEF DESCRIPTION

Reference is now made to the following descriptions taken in conjunction with the accompanying drawings, in which.

Figure 1A:
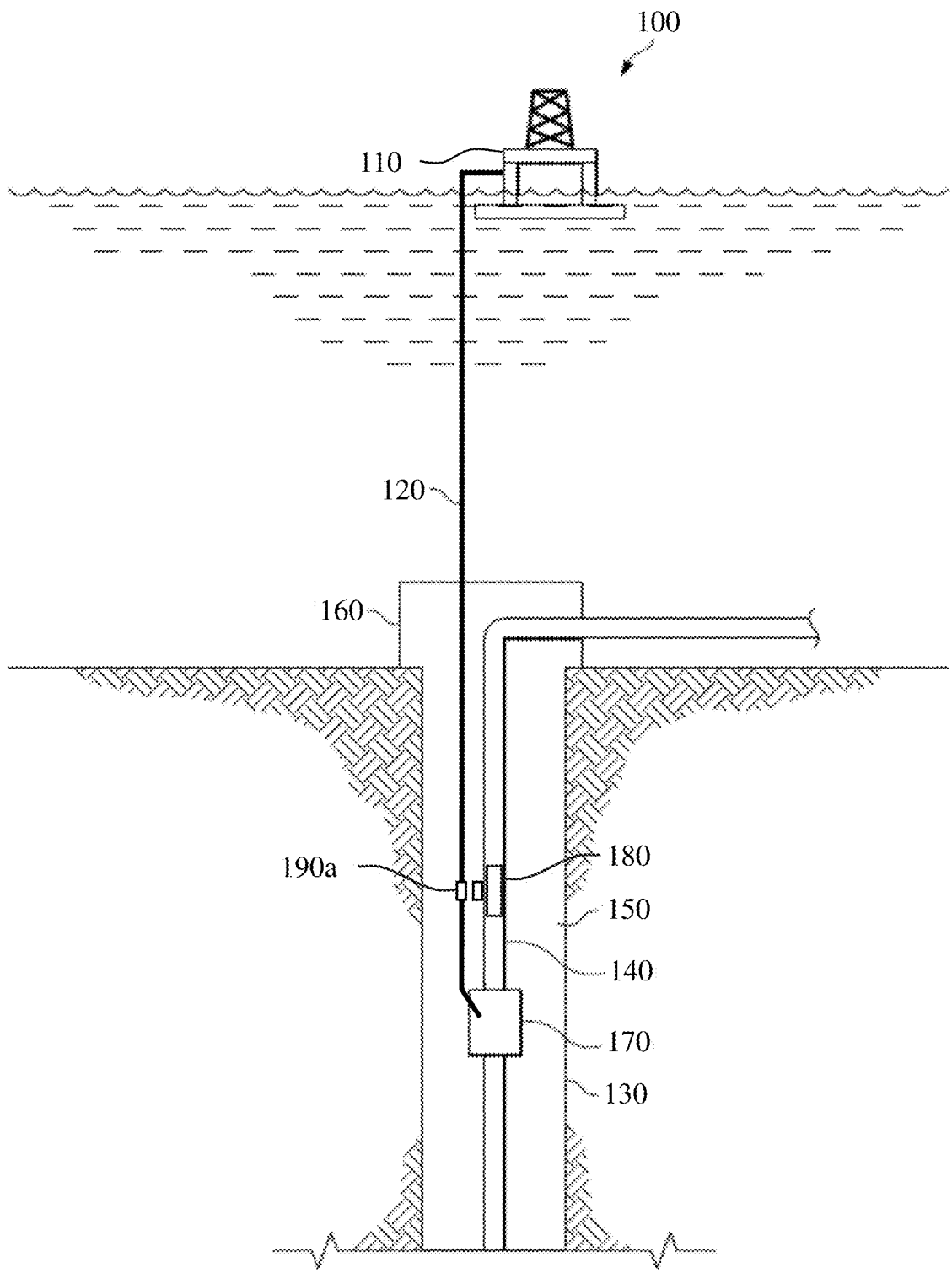
FIG. 1A illustrates a well system designed, manufactured and/or operated according to one or more embodiments of the disclosure.

FIGS. 3A through 3D illustrate different views of a safety valve designed, manufactured and/or operated according to one or more alternative embodiments of the disclosure; and FIGS. 4A through 10D illustrate various different installation states, each with various different views, of a safety valve designed, manufactured and/or operated according to one or more alternative embodiments of the disclosure.

DETAILED DESCRIPTION

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. Furthermore, unless otherwise specified, use of the terms "up," "upper," "upward," "uphole," "upstream," or other like terms shall be construed as generally toward the surface of the subterranean formation; likewise, use of the terms "down," "lower," "downward," "downhole," "downstream," or other like terms shall be construed as generally toward the bottom, terminal end of a well, regardless of the wellbore orientation. Use of any one or more of the foregoing terms shall not be construed as denoting positions along a perfectly vertical axis. Additionally, unless otherwise specified, use of the term "subterranean formation" shall be construed as encompassing both areas below exposed earth and areas below earth covered by water such as ocean or fresh water.

Various values and/or ranges are explicitly disclosed in certain embodiments herein. However, values/ranges from any lower limit may be combined with any upper limit to recite a range not explicitly recited. Similarly, values/ranges from any lower limit may be combined with any other lower limit to recite a range not explicitly recited. In the same way, values/ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited. Similarly, an individual value disclosed herein may be combined with another individual value or range disclosed herein to form another range.

The term "substantially XYZ," as used herein, means that it is within 10 percent of perfectly XYZ. The term "significantly XYZ," as used herein, means that it is within 5 percent of perfectly XYZ. The term "ideally XYZ," as used herein, means that it is within 1 percent of perfectly XYZ. The monicker "XYZ" could refer to parallel, perpendicular, alignment, or other relative features disclosed herein.

The present disclosure has acknowledged that offshore wells are being drilled at ever increasing water depths and in environmentally sensitive waters, and thus safety valves (e.g., including subsurface safety valves (SSSVs)) are necessary. The present disclosure has further acknowledged that SSSVs have inherent problems, and thus from time to time need servicing and/or replacing. In fact, occasionally the tubing retrievable safety valve (TRSV) (e.g., electrically actuated TRSV) will fail, and then a wireline retrievable safety valve (WLRSV) will be run in hole. Unfortunately, each of the TRSV and the WLRSV require their own power source, such as individual tubing encapsulated conductors (TECs).

The present disclosure has, for the first time, developed a switch system (e.g., mechanical, electrical, etc.) that will allow a single primary control line (e.g., single TEC) to operate two different downhole tools, such as the TRSV (e.g., electrically actuated TRSV) and/or WLRSV (e.g., a WLRSV that may be electrically maintained in an open position), or to operate redundant downhole tools, such as a wet connection or an actuator. For example, the switch system could shift power between two different electrical devices (e.g., electromagnetic coils, electric motor or pump, piezoelectric actuator, solenoid valve, etc.) of the two different downhole tools. As another example, the switch system could shift power between an electrical device that has failed to a redundant device that has not been powered. Thus, in at least one embodiment, the single primary control line (e.g., single TEC) could be run downhole from the surface to the switch system, and then the switch system would toggle the power between the TRSV and the WLRSV, as necessary. In at least one embodiment, the switch system would toggle the power from the TRSV to the WLRSV as the WLRSV is ready to be run-in-hole, as the WLRSV is being run-in-hole, or after the WLRSV has been run-in-hole.

Accordingly, a switch system designed, manufactured and/or operated according to one or more embodiments of the disclosure reduces the need to run additional control lines, for example in contingency operations, such as when the TRSV fails and a WLRSV is necessary. This reduces the complexity in running completions, control line protection, tubing hanger penetration, and the overall cost to the customer.

The present disclosure has further developed an improved WLRSV. In at least one embodiment, the WLRSV includes a first portion that is run-in-hole with the TRSV and second and third portions that are run-in-hole after the TRSV is no longer working properly and/or has failed. The first portion of the WLRSV, in at least one embodiment, includes a safety valve sub (e.g., WLRSV sub) that would be run-in-hole along with another safety valve sub (e.g., TRSV sub), and for example the tubing string. In at least one embodiment, the safety valve sub would be located above the TRSV sub. In at least one other embodiment, the safety valve sub would include an electromagnetic assembly (e.g., including one or more coils) (e.g., coupleable to the primary control line (e.g., single TEC) via the aforementioned switch system), as well as a sliding sleeve. The sliding sleeve, in this embodiment, would be configured to slide toward, and then magnetically engage with the electromagnetic assembly when the electromagnetic assembly is energized. In at least one other embodiment, the safety valve sub could include an electromagnetic assembly (e.g., including one or more coils) (e.g., coupleable to the primary control line (e.g., single TEC) via the below discussed switch system), as well as the sliding sleeve. In some embodiments, the electromagnetic assembly creates a static magnetic attraction. In other embodiments, the electromagnetic assembly is an electric motor that creates a torque that can drive a linear actuator.

The WLRSV, in one or more embodiments, further includes the second portion of the WLRSV, which is run-in-hole after the TRSV is no longer working properly and/or has failed. The second portion of the WLRSV, in accordance with one or more embodiments, may be run-in-hole within the TRSV, for example using a latch mechanism to axially fix the second portion of the WLRSV within the TRSV. The second portion of the WLRSV, in one or more embodiments, may include a bore flow management actuator and a valve closure mechanism, and may be located below the first portion of the WLRSV including the electromagnetic assembly and the sliding sleeve.

The WLRSV, in one or more embodiments, further includes a third portion that is run-in-hole after the second portion of the WLRSV is latched downhole (e.g., latched within the TRSV). The third portion, in one or more embodiments, is a mechanical connecting apparatus. For example, in accordance with one or more embodiments of the disclosure, once the second portion of the WLRSV is latched in place, the mechanical connecting apparatus may be run-in-hole between the sliding sleeve of the first portion and the bore flow management actuator of the second portion. In essence, the mechanical connecting apparatus may be run-in-hole to axially fix the sliding sleeve of the first portion of the WLRSV with the bore flow management actuator of the second portion of the WLRSV. Accordingly, any axial movement of the bore flow management actuator would result in the same axial movement of the sliding sleeve, and vice-versa.

In operation, once the mechanical connecting apparatus is in place, fluid pressure (e.g., from within the tubular below the valve closure mechanism) may urge the bore flow management actuator toward the valve closure mechanism. Typically, the bore flow management actuator is unable to move past the valve closure mechanism until a pressure differential across the valve closure mechanism is reduced/eliminated. Once the pressure differential across the valve closure mechanism is reduced/eliminated, for example by pumping fluid down the wellbore toward an uphole side of the valve closure mechanism, the bore flow management actuator may be urged past the valve closure mechanism, for example using one or more springs (e.g., power springs and/or nose springs). As the sliding sleeve is axially fixed to the bore flow management actuator, the axial movement of the bore flow management actuator also axially moves the sliding sleeve. This axial movement of the sliding sleeve brings a ferromagnetic target associated with the sliding sleeve proximate the electromagnetic assembly of the first portion. Accordingly, when the electromagnetic assembly is energized (e.g., before, during or after the ferromagnetic target approaches the one or more coils), the sliding sleeve, and thus the bore flow management actuator axially fixed thereto, may be held in the flow state. The sliding sleeve and the associated bore flow management actuator will be held in this flow state until such time as the electromagnetic assembly is no longer energized, such as when power is turned off to or cut from the electromagnetic assembly.

FIG. 1A illustrates a well system 100 designed, manufactured and/or operated according to one or more embodiments of the disclosure. The well system 100, in at least one embodiment, includes an offshore platform 110 connected to a first downhole device 170 (e.g., first SSSV, such as a TRSV) insert within a wellbore 130 (e.g., the wellbore extending through one or more subterranean formations) and a second downhole device 180 (e.g., second SSSV, such as a WLRSV) insert within the wellbore 130 via a primary electric control line 120 (e.g., single electrical control line, TEC, etc.). In at least one embodiment, the second downhole device 180 is an electrical connection for a WLRSV. For example, the electrical connection may be an inductive coupling, a capacitive coupling, or a conductive coupling with direct electrical contact, among others. An annulus 150 may be defined between walls of the wellbore 130 (e.g., extending through a subterranean formation) and a conduit 140. A wellhead 160 may provide a means to hand off and seal conduit 140 against the wellbore 130 and provide a profile to latch a subsea blowout preventer to. Conduit 140 may be coupled to the wellhead 160. Conduit 140 may be any conduit such as a casing, liner, production tubing, or other oilfield tubulars disposed in a wellbore. The first downhole device 170, or at least a portion thereof, may be interconnected with the conduit 140 (e.g., disposed in line with the conduit 140) and positioned in the wellbore 130. The second downhole device 180, or at least a portion thereof, may be interconnected with the conduit 140 (e.g., positioned within an ID or OD of the conduit 140) and positioned in the wellbore 130. In the illustrated embodiment, the second downhole device 180 is illustrated uphole of the first downhole device 170 (e.g., a portion of it being run-in-hole with the first downhole device 170 and another portion of it being run-in-hole after the first downhole device 170 has failed), but other embodiments may exist wherein the second downhole device 180 is located downhole of the first downhole device 170.

The primary electric control line 120 may extend into the wellbore 130 and may be connected to the first downhole device 170 and the second downhole device 180. The primary electric control line 120 may provide actuation power to the first downhole device 170 and the second downhole device 180. As will be described in further detail below, power may be provided to first downhole device 170 or the second downhole device 180 to actuate or de-actuate the first downhole device 170 or the second downhole device 180. Actuation may comprise opening the first downhole device 170 or the second downhole device 180 to provide a flow path for subsurface production fluids to enter conduit 140, and de-actuation may comprise closing the first downhole device 170 or the second downhole device 180 to close a flow path for subsurface production fluids to enter conduit 140. While the embodiment of FIG. 1A illustrates only the first downhole device 170 and the second downhole device 180, other embodiments exist wherein more than two downhole devices according to the disclosure are used.

In accordance with one embodiment of the disclosure, the well system 100 may further include a switch system 190a positioned between the primary electric control line 120 and each of the first downhole device 170 and the second downhole device 180. The switch system 190a, as discussed above, is configured to switch the incoming power from the primary electric control line 120 between the first downhole device 170 and the second downhole device 180, depending on which of the first downhole device 170 or the second downhole device 180 that the operator intends to operate (e.g., actuate). In at least one embodiment, the first downhole device 170 includes a first electrical devices (e.g., electromagnetic coils, electric motor or pump, piezoelectric actuator, solenoid valve, etc.) and the second downhole device 180 includes a second electrical devices (e.g., electromagnetic coils, electric motor or pump, piezoelectric actuator, solenoid valve, etc.), and the switch system 190a is configured to switch the incoming power from the primary electric control line 120 between the first electrical device of the first downhole device 170 and the second electrical device of the second downhole device 180. Although the well system 100 is depicted in FIG. 1A as an offshore well system, one of ordinary skill should be able to adapt the teachings herein to any type of well, including onshore or offshore. In the embodiment of FIG. 1A, the first downhole device 170 is a TRSV, and the second downhole device 180 is a WLRSV.

Figure 1B:
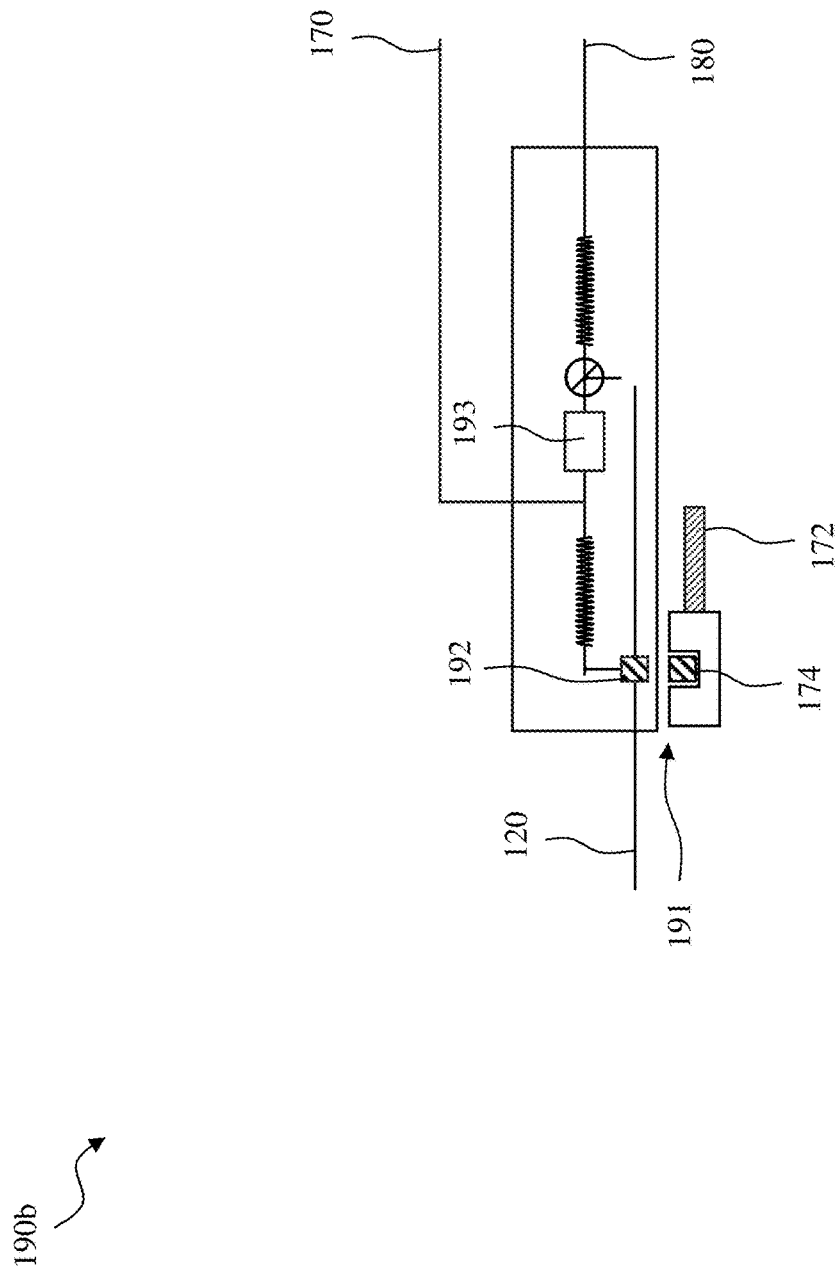
FIGS. 1B and 1C illustrate one embodiment of a switch system designed, manufactured and/or operated according to one or more embodiments of the disclosure, as might be used in the well system of FIG. 1A.
Figure 1C:
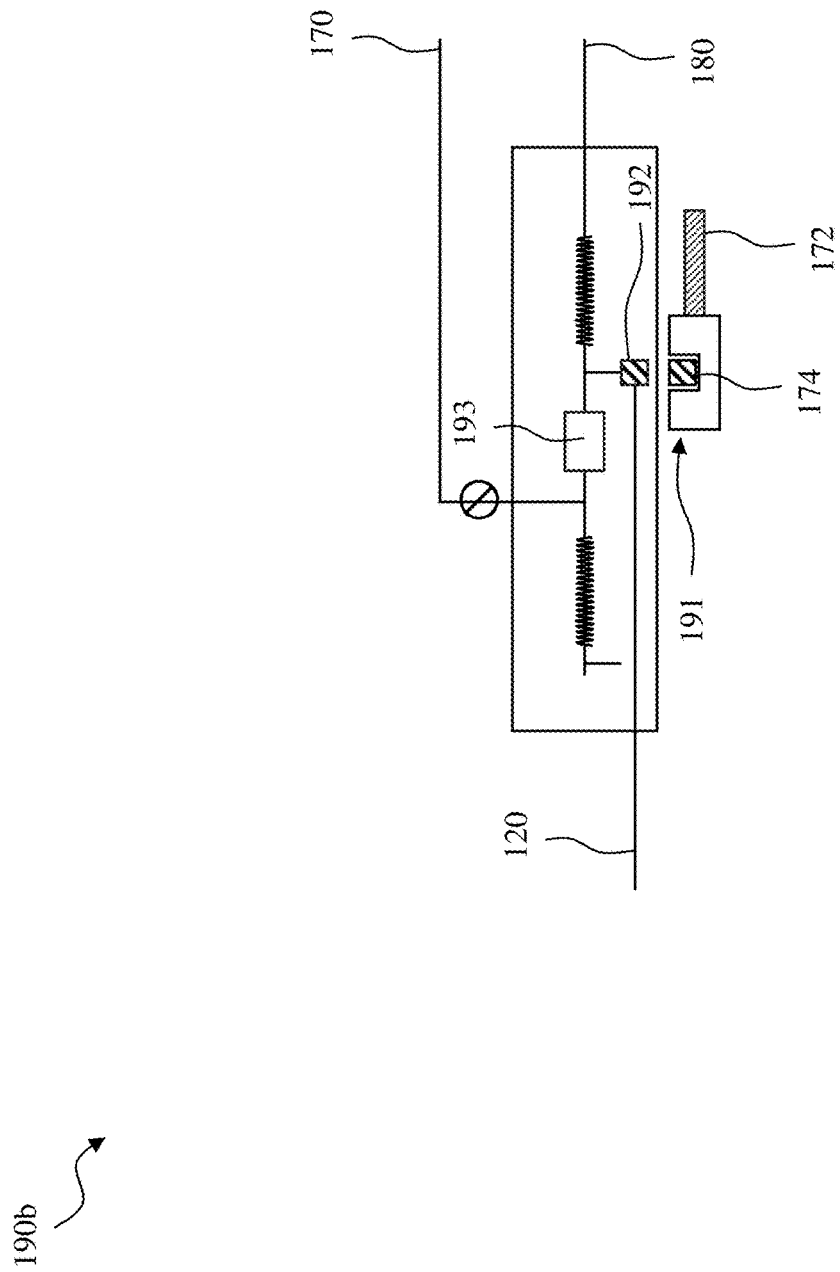

Turning to FIGS. 1B and 1C, illustrated is one embodiment of a switch system 190b designed, manufactured and/or operated according to one or more embodiments of the disclosure, as might be used in the well system 100 of FIG. 1A. The switch system 190b, in the illustrated embodiment, is a mechanical switch system. In the illustrated embodiment, the switch system 190b includes a mechanically activated switch 191, the mechanically activated switch 191 having an input thereof coupled to the primary control line 120, and a first output thereof coupled to the first downhole device 170 and a second output thereof coupled to the second downhole device 180. Accordingly, the mechanically activated switch 191 switches the input power from the primary control line 120 between the first downhole device 170 (e.g., FIG. 1B) and the second downhole device 180 (FIG. 1C), as necessary.

While a number of different embodiments for mechanical switch systems may be used, in the illustrated embodiment, a sliding sleeve 172 of the first downhole device 170 includes a permanent magnet 174 thereon. Similarly, the switch system 190b includes a related permanent magnet 192 therein, for example coupled to the mechanically activated switch 191 (e.g., two or more magnetic features). Furthermore, the switch system 190b may include an insulator 193 separating the first output and the second output. Accordingly, the related permanent magnet 192 will couple with (e.g., decouple from) the permanent magnet 174 to switch the power between the first downhole device 170 and the second downhole device 180, in this instance as the sliding sleeve 172 moves, as shown in FIGS. 1B and 1C. In at least one embodiment, the sliding sleeve 172 is configured to move when the second downhole device 180 is being run-in-hole. Again, while one or more permanent magnets 174 are illustrated in FIGS. 1B and 1C for shifting the switch, in one or more other embodiments the switches are directly shifted as opposed to magnetically shifted.

While not illustrated in FIGS. 1B and 1C, another embodiment may exist wherein a reed switch is employed to switch between the first downhole device 170 and the second downhole device 180. In such an embodiment, one or more of the permanent magnets 192 could be exchanged for a reed switch. Thus, as the permanent magnet 174 passes over the reed switch, the reed switch will switch the power between the first downhole device 170 and the second downhole device 180. In at least one embodiment, ones of the one or more reed switches are single pole single-throw reed switches and/or single pole double-throw reed switches. Those skilled in the art appreciate how such reed switches would be configured to achieve the desires stated herein.

Figure 1D:
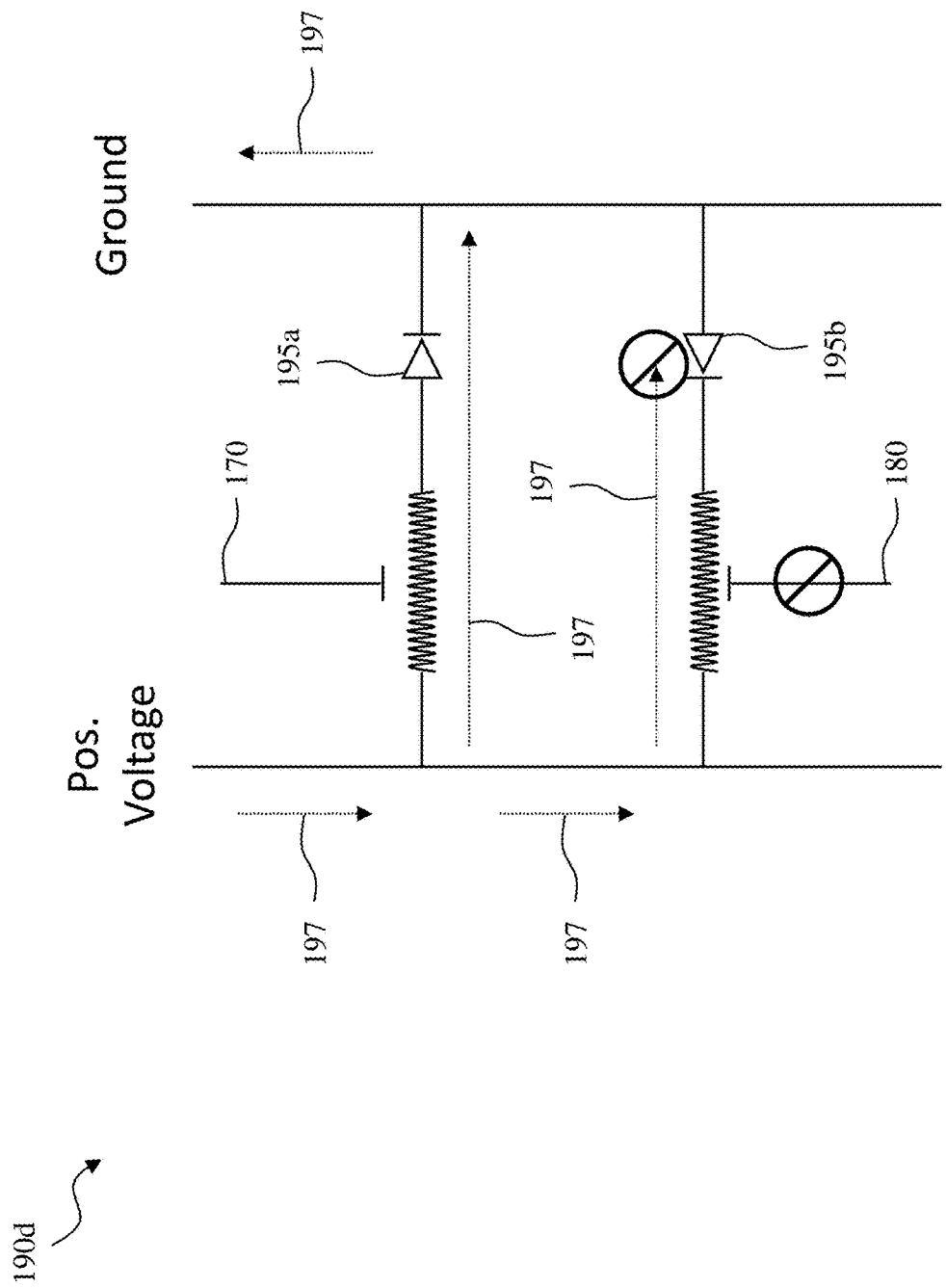
FIGS. 1D and 1E illustrate an alternative embodiment of a switch system designed, manufactured and/or operated according to one or more embodiments of the disclosure, as might be used in the well system of FIG. 1A.
Figure 1E:
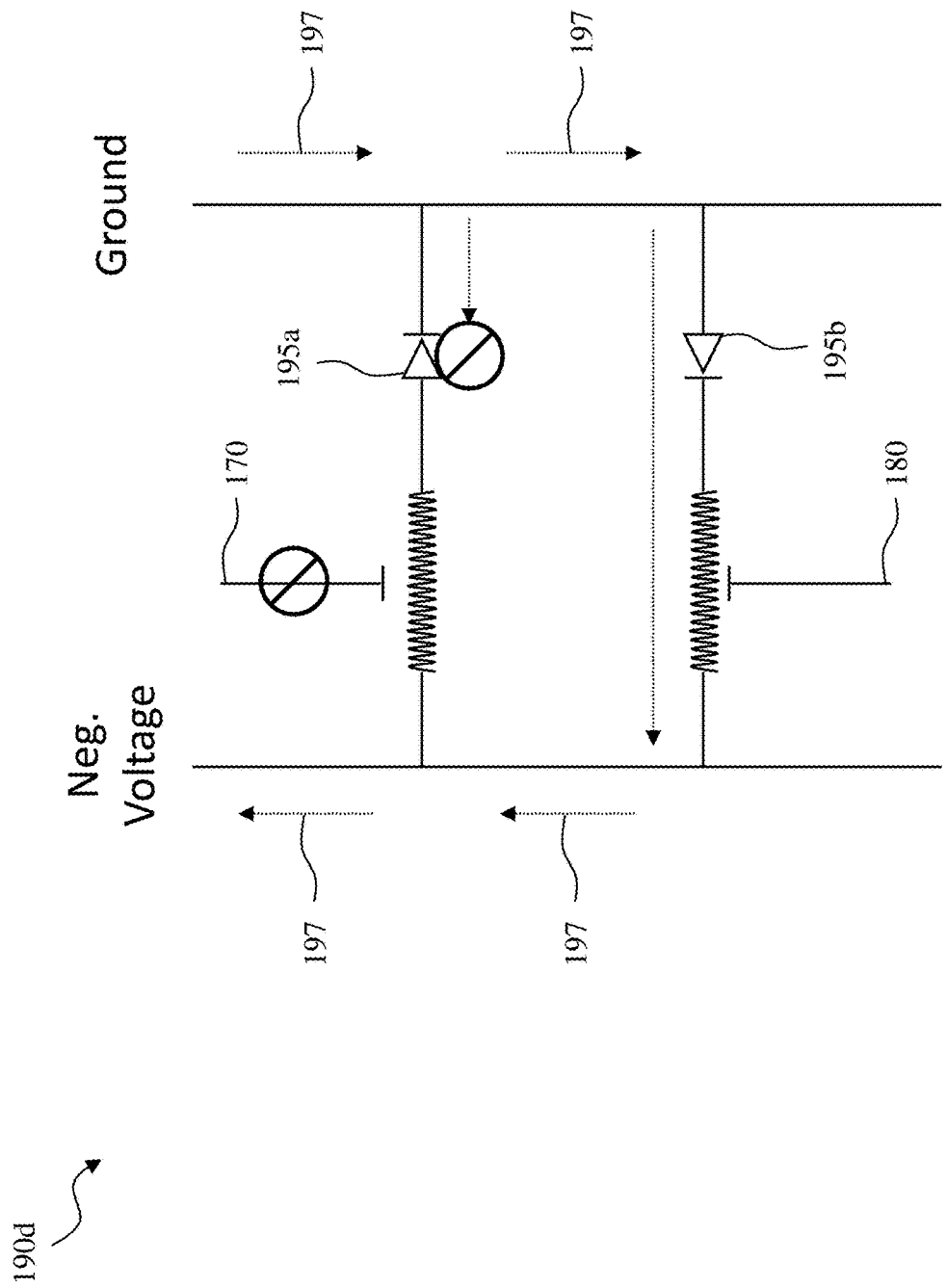

Turning to FIGS. 1D and 1E, illustrated is one embodiment of a switch system 190d designed, manufactured and/or operated according to one or more embodiments of the disclosure, as might be used in the well system 100 of FIG. 1A. The switch system 190d, in the illustrated embodiment, is an electrical switch system, for example including an electrically activated switch. In the illustrated embodiment, the switch system 190d includes two or more oppositely oriented diodes 195a, 195b coupled between the primary control line 120 and each of the first downhole device 170 and the second downhole device 180, respectively. Thus, for example, if a positive voltage is applied to the primary control line 120, the first diode 195a would allow the current 197 to pass therethrough and thus would establish a closed circuit, and therefore the first downhole device 170 would be powered. However, the second diode 195b would not allow the current 197 to pass there through and thus would establish an open circuit, and thus the second downhole device 180 would not be powered. In contrast, if a negative voltage is applied to the primary control line 120, the first diode 195a would not allow the current 197 to pass therethrough and thus would establish an open circuit, and therefore the first downhole device 170 would not be powered. However, the second diode 195b would allow the current 197 to pass therethrough and thus would establish a closed circuit, and thus the second downhole device 180 would be powered. Thus, by toggling the voltage between a positive voltage (e.g., preset positive voltage) and a negative voltage (e.g., preset negative voltage), the switch system 190c powers different ones of the first downhole device 170 and the second downhole device 180.

Figure 1F:
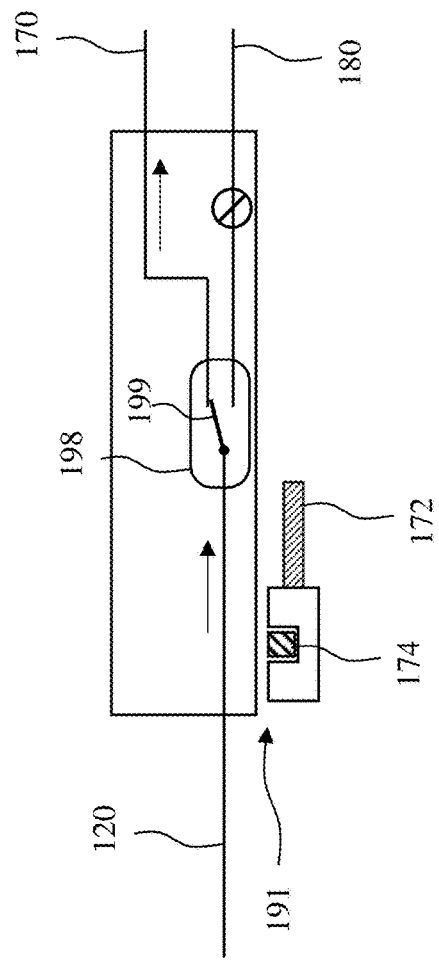
FIGS. 1F and 1G illustrate an alternative embodiment of a switch system designed, manufactured and/or operated according to one or more embodiments of the disclosure, as might be used in the well system of FIG. 1A.
Figure 1G:
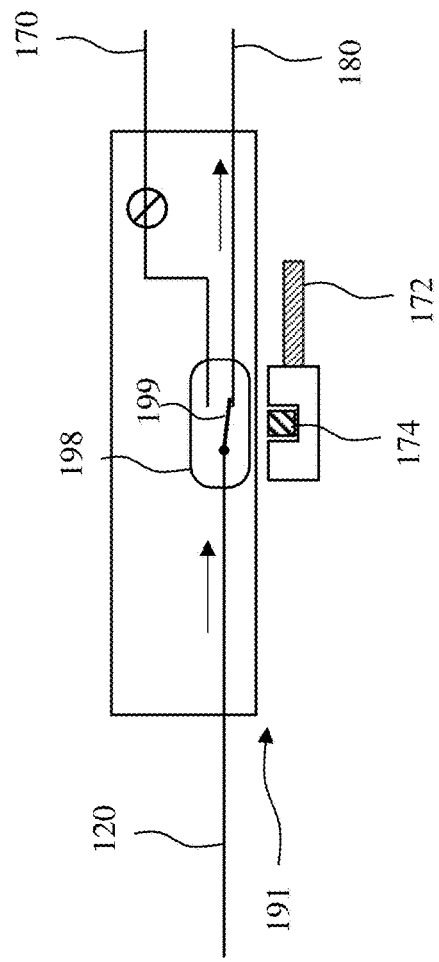

Turning to FIGS. 1F and 1G, illustrated is one embodiment of a switch system 190f designed, manufactured and/or operated according to one or more embodiments of the disclosure, as might be used in the well system 100 of FIG. 1A. The switch system 190f contains a magnetically activated switch 198. In one embodiment, the magnetically activated switch 198 is a reed switch, as shown in FIGS. 1F and 1G. When there is no magnetic field being subjected to the magnetically activated switch 198, such as shown in FIG. 1F, then the contact 199 in the reed switch is biased (e.g., inherently biased) towards an electrical connection with the first downhole device 170, and thus power (e.g., electrical current) can flow to that tool. When there is a magnetic field being subjected to the magnetically activated switch 198, such as shown in FIG. 1G, then the contact 199 in the reed switch is biased (e.g., mechanically biased) towards an electrical connection with the second downhole device 180, and thus power (e.g., electrical current) can flow to that tool. For example, in FIG. 1 the permanent magnet 174 creates a magnetic attraction that pulls the contact 199 towards an electrical connection with the second downhole device 180 and thus power (e.g., electrical current) can flow to that tool. The magnetically activated switch 198 can employ first and second reed switches rather than the double throw switch that is shown, wherein the second reed switch is configured to work in conjunction with the first reed switch to switch power between the primary control line and the first downhole device and the primary control line and the second downhole device. One of the advantages of the reed switch is that it is a mechanically activated switch and contains no electronics. As an alternative embodiment, the magnetically activated switch 198 could be a tunnel magneto-resistance (TMR) switch. A TMR switch contains a magnetic tunnel junction where the resistance of the junction varies with magnetic field. The TMR switch varies between high resistance (open switch) and low resistance (closed switch) with applied magnetic field.

Figure 2A:
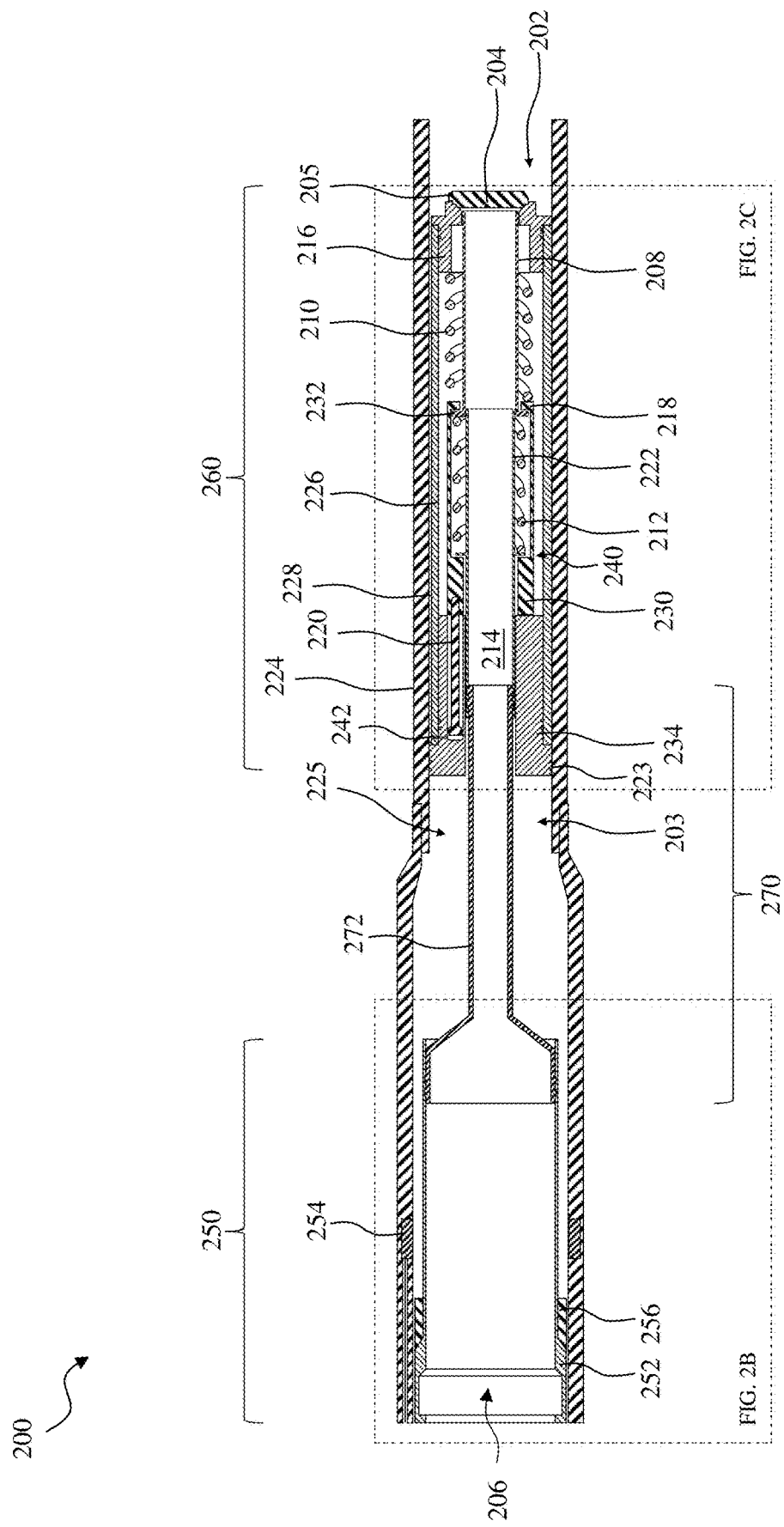
FIGS. 2A through 2F illustrate one embodiment of downhole device, including a safety valve designed, manufactured and/or operated according to one or more embodiments of the disclosure.
Figure 2B:
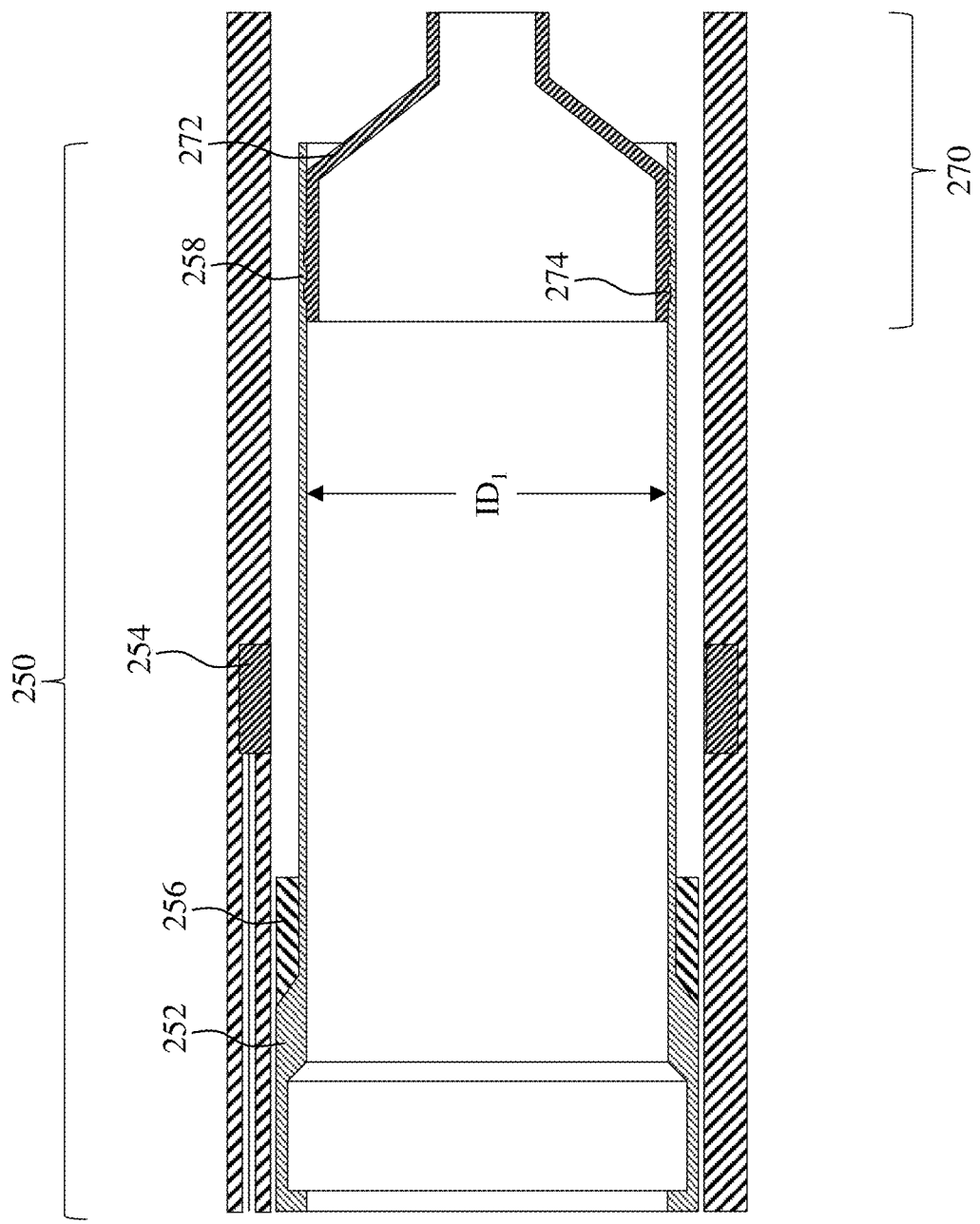
Figure 2C:
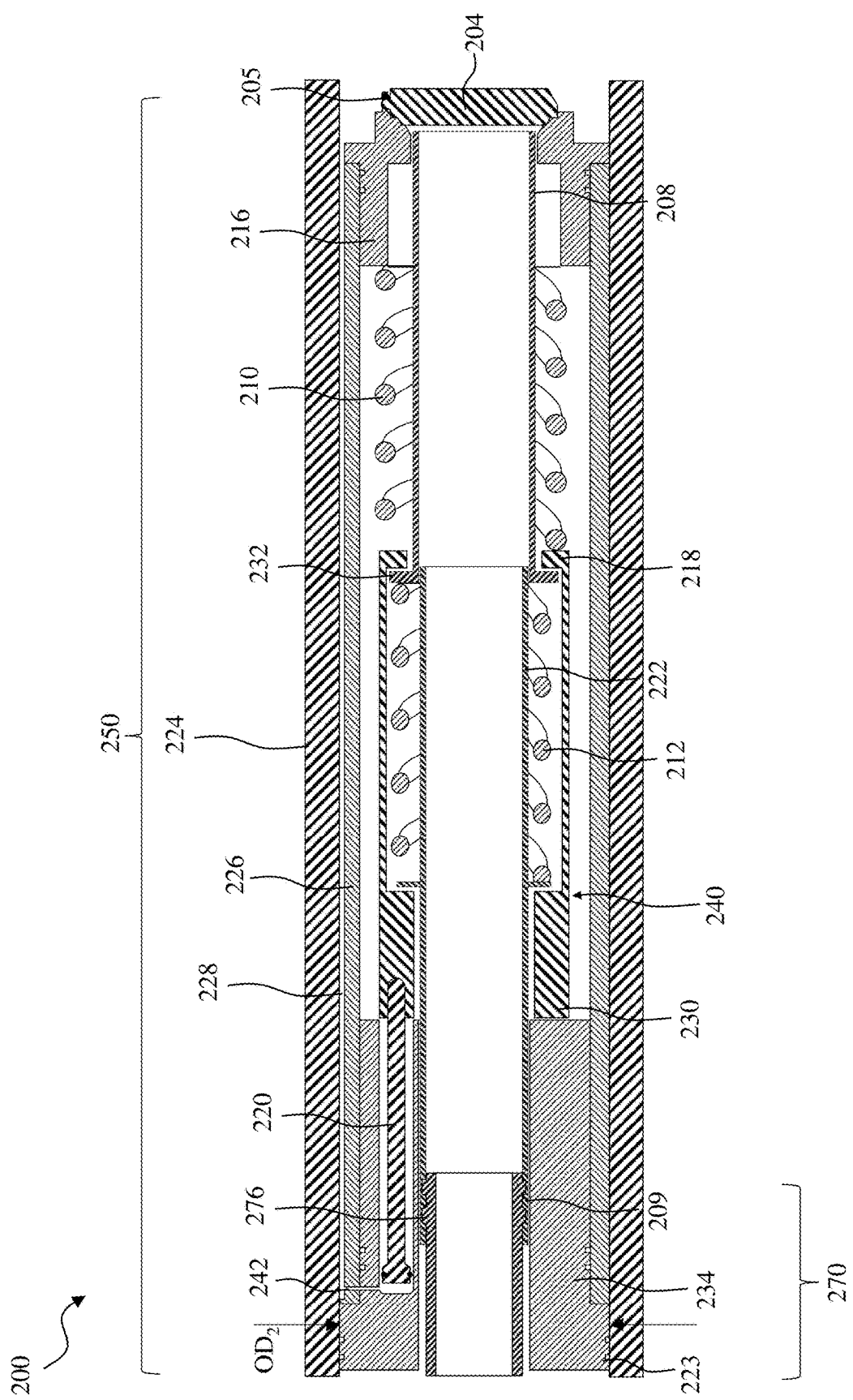
Figure 2D:
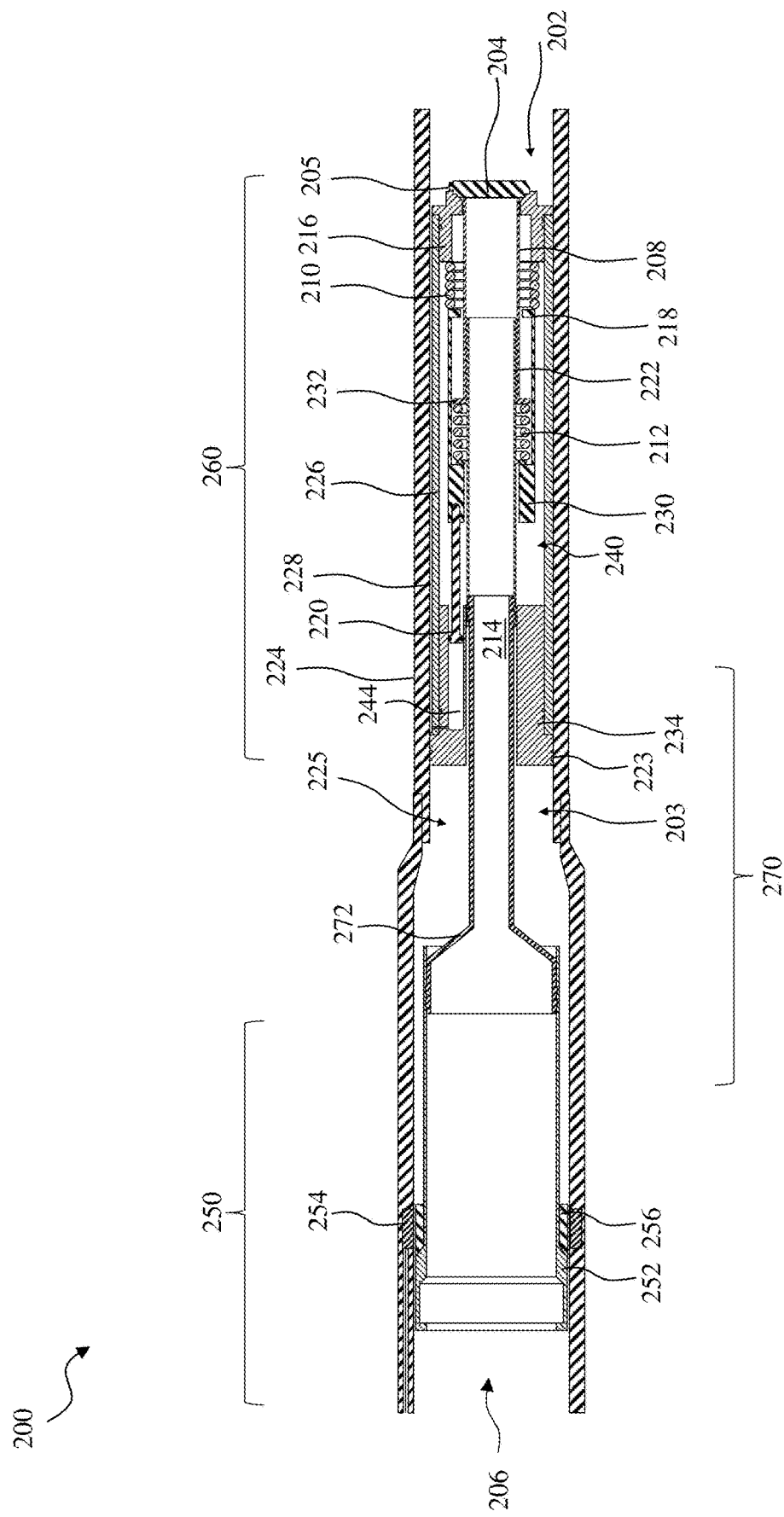
Figure 2E:
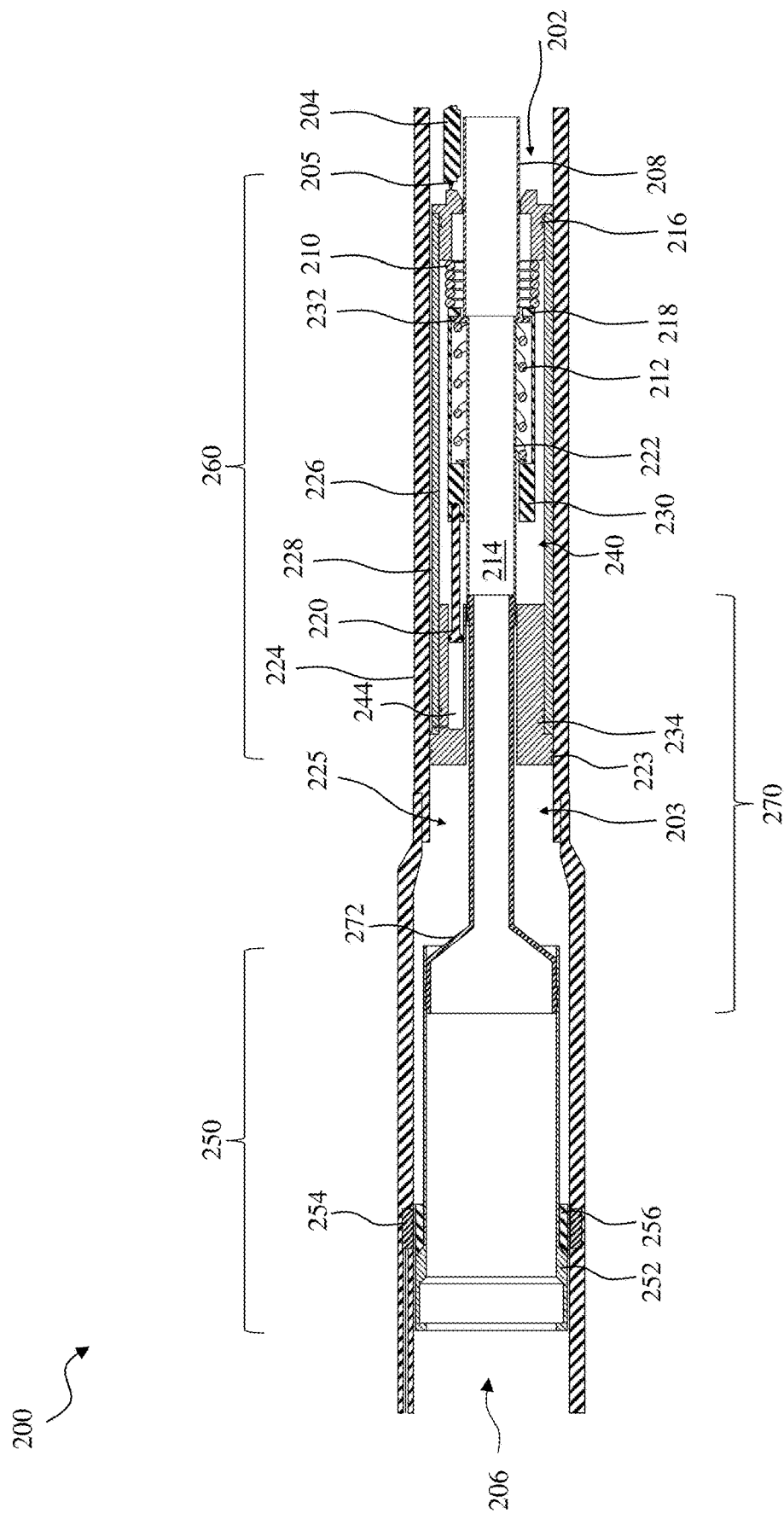

Turning to FIGS. 2A through 2F illustrated is one embodiment of a downhole device, including a safety valve 200 designed, manufactured and/or operated according to one or more embodiments of the disclosure, as might employ the first, second and third portions of the WLRSV, as discussed above. FIGS. 2A through 2C illustrate different views of the safety valve 200 in a first closed position, its unpowered electromagnetic assembly and magnetic target decoupled from one another. FIG. 2D illustrates the safety valve 200 of FIGS. 2A through 2C in a second closed position with power (DC power in this embodiment) supplied to the electromagnetic assembly, thereby coupling the electromagnetic assembly and the magnetic target together. FIG. 2E illustrates the safety valve 200 of FIG. 2D now in an open position, the powered (DC powered) electromagnetic assembly and magnetic target remaining magnetically coupled (e.g., fixedly coupled) with one another.

Figure 2F:
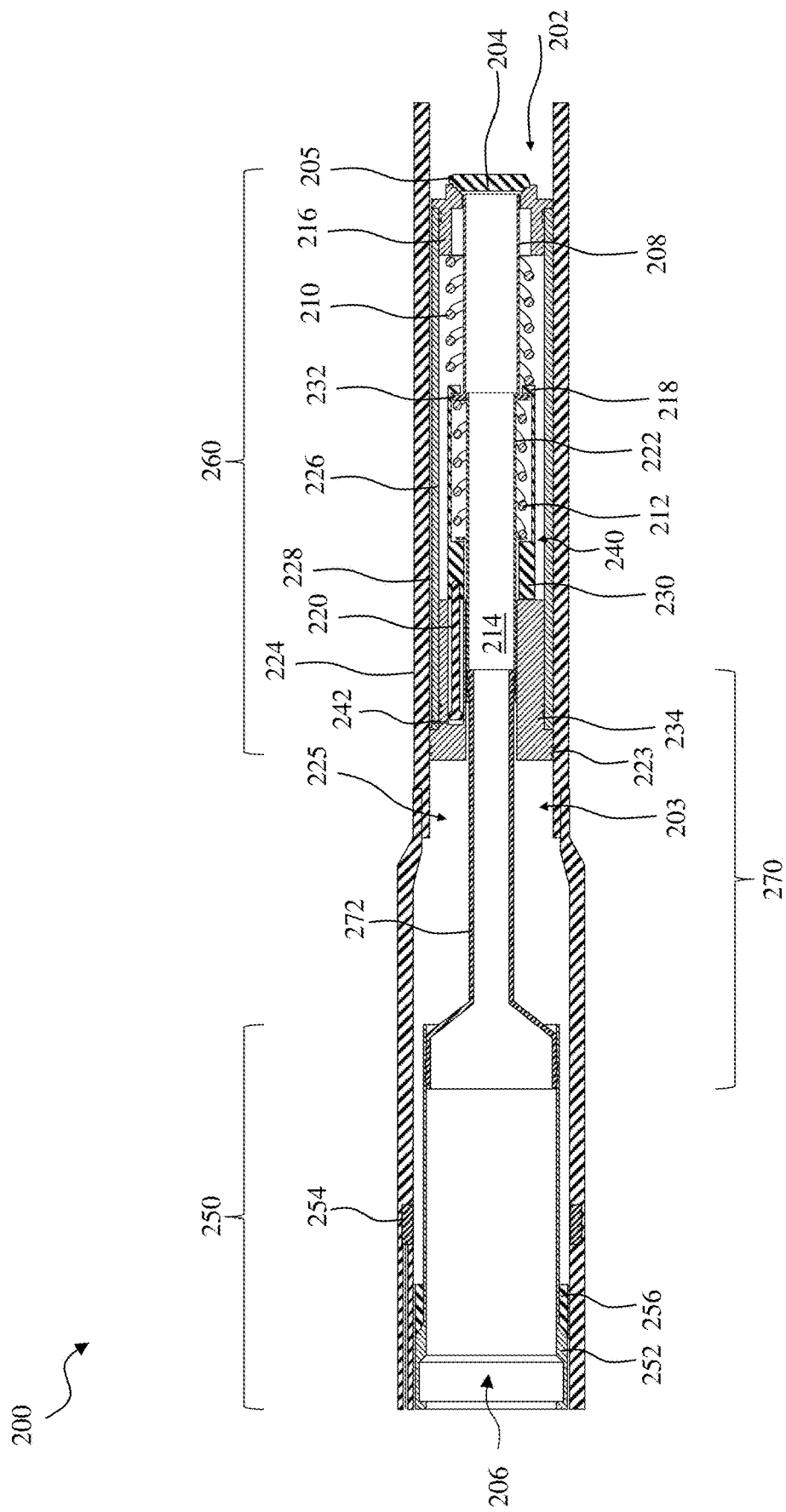

FIG. 2F illustrates the safety valve 200 of FIG. 2E after power (DC power) has been cut to the electromagnetic assembly, and thus the safety valve 200 returns to the first closed position. In yet another embodiment, the safety valve 200 may be indirectly moved back to the first closed position, for example if an electrical logic circuit determines that the electrical power has been interrupted and initiates a closing of the safety valve 200.

Referring initially to FIGS. 2A through 2C, the safety valve 200 is illustrated in the first closed position. The safety valve 200, in one or more embodiments, may include an outer housing 224 (e.g., tubular housing, wellbore tubing, etc.) containing a central bore 225 therein, wherein components of the safety valve 200 may be disposed within the central bore 225. An upper valve assembly 234 (e.g., also the magnetic target in this embodiment) may be attached to the outer housing 224, and may further include one or more sealing elements 223, such that fluid communication from a lower section 202 to an upper section 203 is prevented.

A sleeve 226 may be attached between the upper valve assembly 234 and a lower valve assembly 216. A bore flow management actuator 240 may be disposed within the sleeve 226. The bore flow management actuator 240 may include a translating sleeve 222 and a flow tube main body 208. A flow path 214 may be defined by an interior of the flow tube main body 208. As illustrated in FIGS. 2A through 2C, the flow path 214 may extend from an interior of a conduit 206 through an interior of the flow tube main body 208. As will be discussed in further detail below, when the safety valve 200 is in an open position, the flow path 214 may extend from an interior of the conduit 206 through an interior of the flow tube main body 208 and further into the lower section 202.

The safety valve 200 may further include a power spring 210 disposed between the lower valve assembly 216 and a translating sleeve shoulder 218. As illustrated in FIGS. 2A through 2C, the translating sleeve shoulder 218 and a flow tube shoulder 232 may be in contact when the safety valve 200 is in the first closed position. The power spring 210 may provide a positive spring force against the translating sleeve shoulder 218, which may keep the flow tube main body 208 in a first position. The power spring 210 may also provide a positive spring force to return the flow tube main body 208 and the translating sleeve 222 to the first position (e.g., from a second position), as will be explained below.

The safety valve 200 may further include a nose spring 212 disposed between a translating sleeve assembly 230 and the flow tube shoulder 232. The translating sleeve assembly 230 may be disposed between and attached to a piston 220 and the translating sleeve 222. The power spring 210 and the nose spring 212 are depicted as coil springs in FIGS. 2A through 2F. However, the power spring 210 and the nose spring 212 may comprise any kind of spring and remain within the scope of the present disclosure, such as, for example, coil springs, wave springs, or fluid springs, among others.

In the illustrated embodiment, the translating sleeve assembly 230 may allow a force applied to a distal end of the piston 220 to be transferred into the translating sleeve 222. A force may be applied to the distal end of the piston 220 by way of fluid communication from a channel 228 through an orifice 242. A force applied to the piston 220 may move the translating sleeve 222 from a first position to a second position. The nose spring 212 may provide a positive spring force against the translating sleeve assembly 230 and the flow tube shoulder 232, which may return the translating sleeve 222 from the second position to the first position, as will be discussed in greater detail below.

In the first closed position, the translating sleeve 222 and the flow tube main body 208 are positioned such that the translating sleeve shoulder 218 and the flow tube shoulder 232 are in contact and the power spring 210 and the nose spring 212 are in an extended position. In the first closed position, the translating sleeve 222 may be referred to as being in a first position and the flow tube main body 208 may be referred to as being in a first position.

In at least one embodiment, the bore flow management actuator 240 is configured to slide from a first initial state to a first subsequent state to move a valve closure mechanism 204 between a first closed state and a first open state. In the first closed state, the valve closure mechanism 204 may isolate the lower section 202 from the flow tube main body 208. When the valve closure mechanism 204 is in a first closed state, as in FIGS. 2A through 2C, the valve closure mechanism 204 may prevent formation fluids and pressure from flowing into the flow tube main body 208 from the lower section 202. Although FIGS. 2A through 2C illustrate the valve closure mechanism 204 as a flapper valve, the valve closure mechanism 204 may be any suitable type of valve such as a flapper type valve or a ball type valve, for example. As will be illustrated in further detail below, the valve closure mechanism 204 may be actuated into a first open state to allow formation fluids to flow from the lower section 202 through the flow path 214 (e.g., defined by the lower section 202, an interior of the flow tube main body 208 and an interior of the conduit 206).

When the safety valve 200 is in the first closed position, no amount of differential pressure across the valve closure mechanism 204 will allow formation fluids to flow from the lower section 202 into the flow path 214. In the first closed position, the safety valve 200 will only allow fluid flow from conduit 206 into the lower section 202, but not from the lower section 202 into the conduit 206. In the instance that pressure in the conduit 206 is increased, the valve closure mechanism 204 will remain in the closed position until the pressure in the conduit 206 is increased above the pressure in the lower section 202 plus the closing pressure provided by the valve closure mechanism spring 205, sometimes referred to herein as valve opening pressure. When the valve opening pressure is reached, the valve closure mechanism 204 may open and allow fluid communication from the conduit 206 into the lower section 202. In this manner, treatment fluids such as surfactants, scale inhibitors, hydrate treatments, and other suitable treatment fluids may be introduced into the subterranean formation. The configuration of the safety valve 200 may allow treatment fluids to be pumped from a surface, such as a wellhead, into the subterranean formation without actuating a control line or balance line to open the valve. Once pressure in the conduit 206 is decreased below the valve opening pressure, the valve closure mechanism spring 205 will return the valve closure mechanism 204 to the closed position, and thus flow from the conduit 206 into the lower section 202 will cease. When the valve closure mechanism 204 has returned to the closed position, flow from the lower section 202 into the flow path 214 will be prevented. Should a pressure differential across the valve closure mechanism 204 be reversed, such that pressure in the lower section 202 is greater than a pressure in the conduit 206, the valve closure mechanism 204 will remain in a closed position, such that fluids in the lower section 202 are prevented from flowing into the conduit 206.

In the illustrated embodiment, the safety valve 200 includes a first portion 250, a second portion 260 (e.g., the second portion 260 may include those features disclosed in the paragraph above, for example those feature located between the upper valve assembly 234 and the valve closure mechanism 204, and specifically the bore flow management actuator 240 and the valve closure mechanism 204), and a third portion 270. As indicated above, in at least one embodiment, the first portion 250 has a first portion minimum inside diameter (ID1) and is run-in-hole with the TRSV, and the second portion 260 and the third portion 270 are run-in-hole after the TRSV is no longer working properly and/or has failed. For example, in at least one embodiment, the second portion 260 has a second portion maximum outside diameter (OD2), the second portion maximum outside diameter (OD2) being less than the first portion minimum inside diameter (ID1) such that the second portion 260 may be run-in-hole after the first portion 250. Furthermore, the third portion 270 may be run-in-hole in a separate step after the second portion 260.

In one or more embodiments, the first portion 250 includes a sliding sleeve 252, and an electromagnetic assembly 254. The sliding sleeve 252, in one or more embodiments, may also include a magnetic target 256 configured to magnetically couple with the electromagnetic assembly 254. In at least one embodiment, the magnetic target 256 is coupled to the sliding sleeve 252 and the electromagnetic assembly 254 is axially fixed with the wellbore tubing. In at least one embodiment, the magnetic target 256 is configured to slide with the sliding sleeve 252 and align with and couple to the electromagnetic assembly 254. The sliding sleeve 252, in one or more embodiments, additionally includes a sliding sleeve profile 258 located along an inside diameter (ID) thereof. In the illustrated embodiment, the electromagnetic assembly 254 is located in the outer housing 224 and the magnetic target 256 is located on the sliding sleeve 252, but the opposite could be designed.

In one or more other embodiments, the third portion 270 includes a mechanical connecting apparatus 272, the mechanical connecting apparatus 272 axially fixing together the sliding sleeve 252 of the first portion 250 and at least a portion of the bore flow management actuator 240 of the second portion 260. In the illustrated embodiment, the mechanical connecting apparatus 272 includes an uphole mechanical connecting apparatus profile 274 configured to engage with the sliding sleeve profile 258 of the sliding sleeve 252, as well as a downhole mechanical connecting apparatus profile 276 configured to engage with a bore flow management actuator profile 209 of the bore flow management actuator 240 (e.g., translating sleeve 222 of the bore flow management actuator 240).

With reference to FIG. 2D the safety valve 200 is illustrated in a second closed position. In the second closed position, the translating sleeve 222 may be displaced from the first position to a second position, which is relatively closer in proximity to the valve closure mechanism 204. The flow tube main body 208 may remain in the first position, or alternatively only slightly downhole from the first position. When the safety valve 200 is in the second closed position, both the power spring 210 and the nose spring 212 may be in a compressed state.

To move the translating sleeve 222 to the second position, differential pressure across the valve closure mechanism 204 may be increased by lowering the pressure in the conduit 206 or increasing pressure in the lower section 202. Lowering pressure in the conduit 206 or increasing pressure in the lower section 202 may cause fluid from the lower section 202 to flow through the channel 228 defined between the sleeve 226 and the outer housing 224 into the orifice 242. The orifice 242 may allow fluid communication into the piston tube 244, whereby fluid pressure may act on the proximal end of the piston 220. The force exerted by fluid pressure on the proximal end of the piston 220 may displace the piston 220 towards the valve closure mechanism 204 by transferring the force through the piston 220, the translating sleeve assembly 230, and the translating sleeve shoulder 218. The nose spring 212 may provide a spring force against the flow tube shoulder 232 and the translating sleeve assembly 230, and the power spring 210 may provide a spring force against the translating sleeve shoulder 218 and the lower valve assembly 216.

Although not illustrated in FIGS. 2A through 2F, the flow tube main body 208 may include channels that allow pressure and/or fluid communication between the flow path 214 and an interior of the sleeve 226. Collectively the spring forces from the power spring 210 and the nose spring 212 may resist the movement of the piston 220 until the differential pressure across the valve closure mechanism 204 is increased beyond the spring force provided from the power spring 210 and the nose spring 212. Increasing differential pressure may include decreasing pressure in the conduit 206 such that the pressure in the lower section 202 is relatively higher than the pressure in the conduit 206. When the differential pressure across the valve closure mechanism 204 is increased, the differential pressure across the piston 220 also increases. When the differential pressure across the valve closure mechanism 204 is increased beyond the spring force provided by the nose spring 212 and the power spring 210, the nose spring 212 and the power spring 210 may compress and allow the translating sleeve 222 to move into the second position. Differential pressure across the valve closure mechanism 204 may be increased by pumping fluid out of the conduit 206, for example. In the instance that the lower section 202 is fluidically coupled to a non-perforated section of pipe or where there is a plug in a conduit 206 fluidically coupled to the lower section 202 that prevents pressure being transmitted from the lower section 202 to the piston 220, a pressure differential across the valve closure mechanism 204 may be induced through pipe swell.

In the second closed position, the safety valve 200 remains safe as no fluids from the lower section 202 can flow into the flow path 214. In the second closed position no amount of differential pressure across the valve closure mechanism 204, the differential pressure being relatively higher pressure in the lower section 202 and relatively lower pressure in the conduit 206, should cause the valve closure mechanism 204 to open to allow fluids from the lower section 202 to flow into the flow path 214, as the pressure from the lower section 202 is acting on the valve closure mechanism 204. If pressure is increased in the conduit 206, the differential pressure across the valve closure mechanism 204 decreases and the translating sleeve 222 may move back to the first position illustrated in FIGS. 2A through 2C. Unlike conventional safety valves that generally require a control line to supply pressure to actuate a piston to move a translating sleeve, the safety valve 200 may only require pressure supplied by the wellbore fluids in the lower section 202 to move the translating sleeve.

With continued reference to FIG. 2D, the piston 220 may be fixedly attached to the translating sleeve assembly 230. Although illustrated as a single piston in FIGS. 2A through 2F, the piston 220 may comprise a plurality of pistons and remain within the scope of the disclosure. As the sliding sleeve 252 and the mechanical connecting apparatus 272 are rigidly fixed together, and the mechanical connecting apparatus 272 is rigidly fixed to the bore flow management actuator 240 (e.g., translating sleeve 222 of the bore flow management actuator 240), any movement of the translating sleeve 222 also moves the mechanical connecting apparatus 272 and the sliding sleeve 252. As shown in FIG. 2D, this movement may align the electromagnetic assembly 254 and the magnetic target 256.

Before, during or after the translating sleeve 222 is allowed to come to the second position as described above and shown in FIG. 2D, the electromagnetic assembly 254 may be powered on. Powering the electromagnetic assembly 254 may cause the electromagnetic assembly 254 to magnetically fix with the magnetic target 256 to hold the sliding sleeve 252 of the first portion 250 in its axial downhole position.

In FIGS. 2A through 2F, the electromagnetic assembly 254 is depicted as one coil circumscribing the tubular, but there may be any number of coils in any orientation to fix the sliding sleeve 252, and thus bore flow management actuator 240 in place. The electromagnetic assembly 254 may apply a force in a substantially radial or axial direction, for example. The force applied by the electromagnetic assembly 254 may be any amount of force, including but not limited to, a force in a range of about 45 Newtons to about 45000 Newtons. The electromagnetic assembly 254 may provide a means to hold the sliding sleeve 252 and the bore flow management actuator 240 at any well depth. Hydraulic systems used in previous wellbore safety valves generally require control and balance lines to actuate and hold a valve open which may have pressure limitations. The limitations experienced by hydraulic systems may be overcome by using the electromagnetic assembly 254 described herein, as only well pressure is required to open the safety valve 200. Again, when the translating sleeve 222 is in the second position either when the electromagnetic assembly 254 is switched on or switched off, no amount of differential pressure across the valve closure mechanism 204 will open the valve closure mechanism 204, the differential pressure being a pressure difference between a relatively higher pressure in the section 202 and a relatively lower pressure in the conduit 206.

With reference to FIG. 2E, the safety valve 200 is illustrated in an open position. When the safety valve 200 is in the open position, the translating sleeve 222 may be fixed in place in the second position, as in FIGS. 2D and 2E, through the force provided by the electromagnetic assembly 254, the force being transferred through the mechanical connecting apparatus 272 to the bore flow management actuator 240, for example via the translating sleeve 222. The flow tube main body 208 is illustrated as being axially shifted from the first position illustrated in FIGS. 2A through 2D to a second position in FIG. 2E. When the flow tube main body 208 is in the second position, the flow tube shoulder 232 and the translating sleeve shoulder 218 may be in contact and the flow tube main body 208 may have displaced the valve closure mechanism 204 into an open position. The nose spring 212 may be in an uncompressed state, while the power spring 210 may be in a compressed state.

The flow tube main body 208 may be moved from the first position to the second position when the translating sleeve 222 is fixed in place in the second position by the electromagnetic assembly 254, as described above. When the translating sleeve 222 is fixed in the second position through the force provided by the electromagnetic assembly 254, the nose spring 212 may provide a positive spring force against the flow tube shoulder 232 and the translating sleeve assembly 230. The positive spring force from the nose spring 212 may be transferred through the flow tube main body 208 into the valve closure mechanism 204. The flow tube main body 208 will not move to the second position until differential pressure across the valve closure mechanism 204 exists and the translating sleeve 222 is fixed in position. The differential pressure may be decreased by pumping into the conduit 206, thereby increasing the pressure in the conduit 206. The pressure may be increased in the conduit 206 until the differential pressure across the valve closure mechanism 204 is decreased to a point where the positive spring force from the nose spring 212 is greater than the differential pressure across the valve closure mechanism 204. Thereafter, the nose spring 212 may extend and move the flow tube main body 208 into the second position by acting on the translating sleeve assembly 230 and the flow tube shoulder 232, which are held in place via the electromagnetic assembly 254 and one or more other features. When the flow tube main body 208 is in the second position, fluids such as oil and gas in the lower section 202 may be able to flow into the flow path 214 and to a surface of the wellbore such as to a wellhead. Safety valve 200 may remain in the open position defined by the translating sleeve 222 being in the second position and the flow tube main body 208 being in the second position, as long as the electromagnetic assembly 254 remains powered on.

The safety valve 200 may be moved back to the first closed position, as illustrated in FIG. 2F, by powering off the electromagnetic assembly 254. As previously discussed, the electromagnetic assembly 254 may fix the sliding sleeve 252 and the flow tube main body 208 in place in the second position when the electromagnetic assembly 254 remains powered on. When the electromagnetic assembly 254 is powered off, the sliding sleeve 252 and the flow tube main body 208 may no longer be fixed in place. The power spring 210 may provide a positive spring force against the lower valve assembly 216, translating the sleeve shoulder 218 and the flow tube shoulder 232 uphole. The positive spring force from the power spring 210 may axially displace the translating sleeve 222 to the first position and the flow tube main body 208 to the first position, thereby returning the safety valve 200 to the first closed position illustrated in FIGS. 2A through 2C, and 2F. The positive spring force from the power spring 210 may also axially displace the electromagnetic assembly 254 to the position illustrated in FIGS. 2A through 2C, and 2F, by transmitting the positive spring force through the mechanical connecting apparatus 272.

Figure 3B:
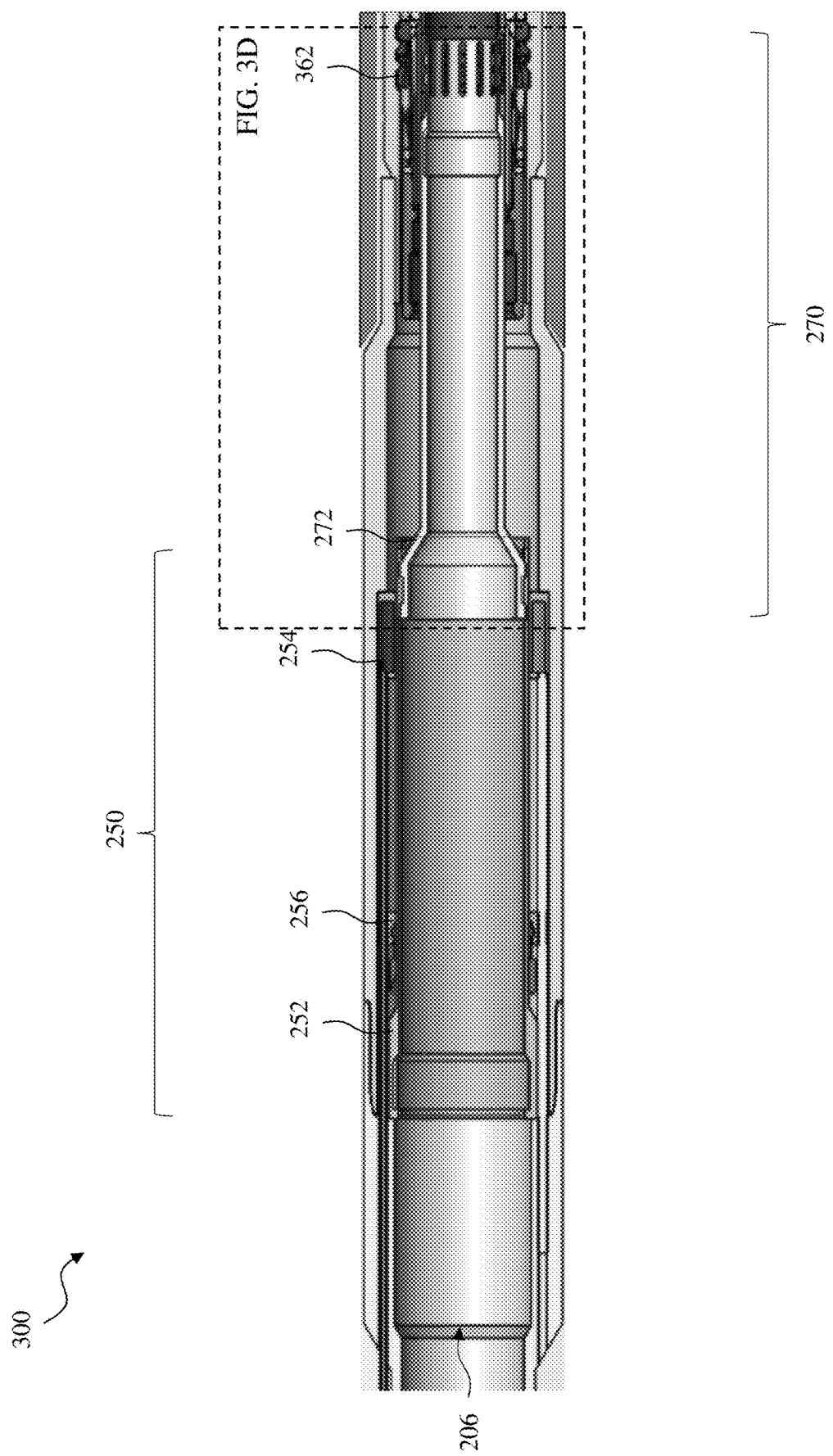
Figure 3C:
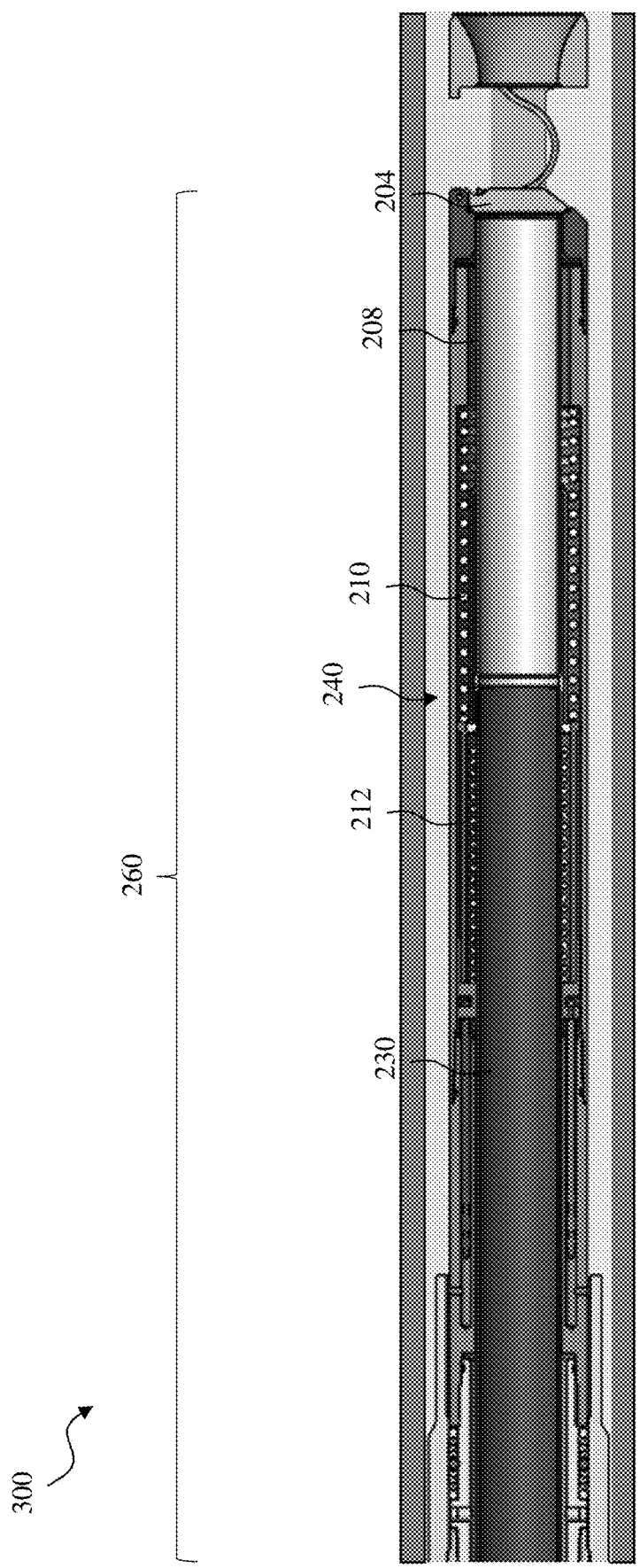
Figure 3D:
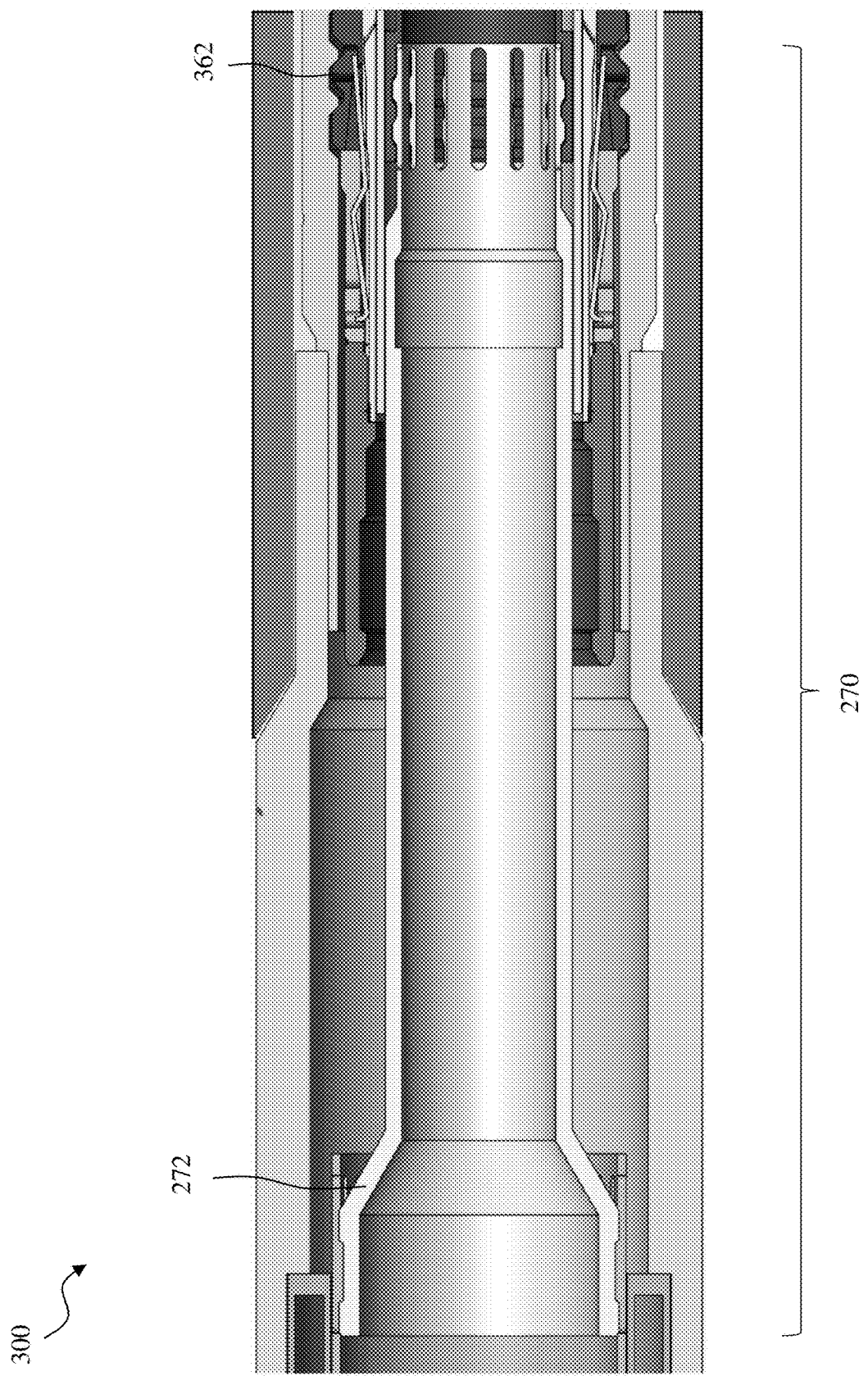
Figure 4C:
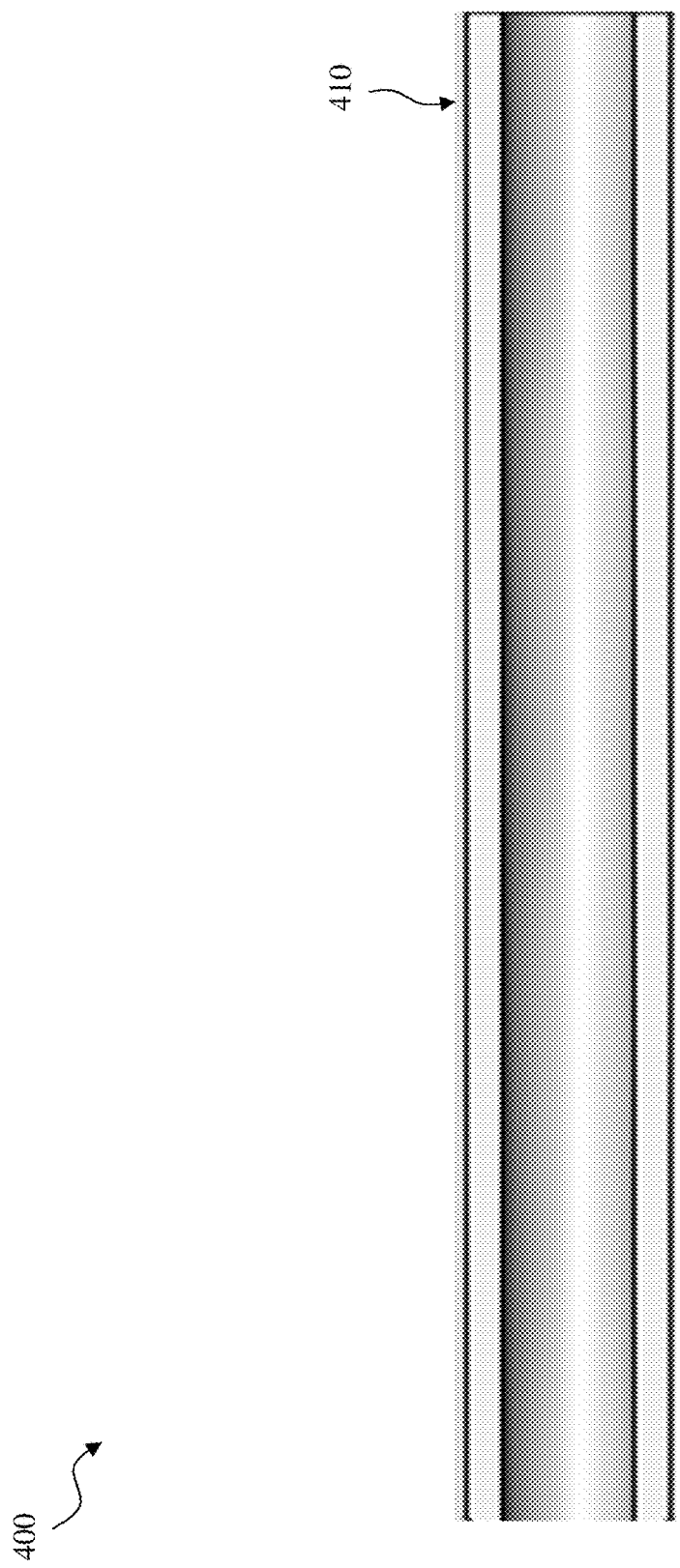
Figure 4D:
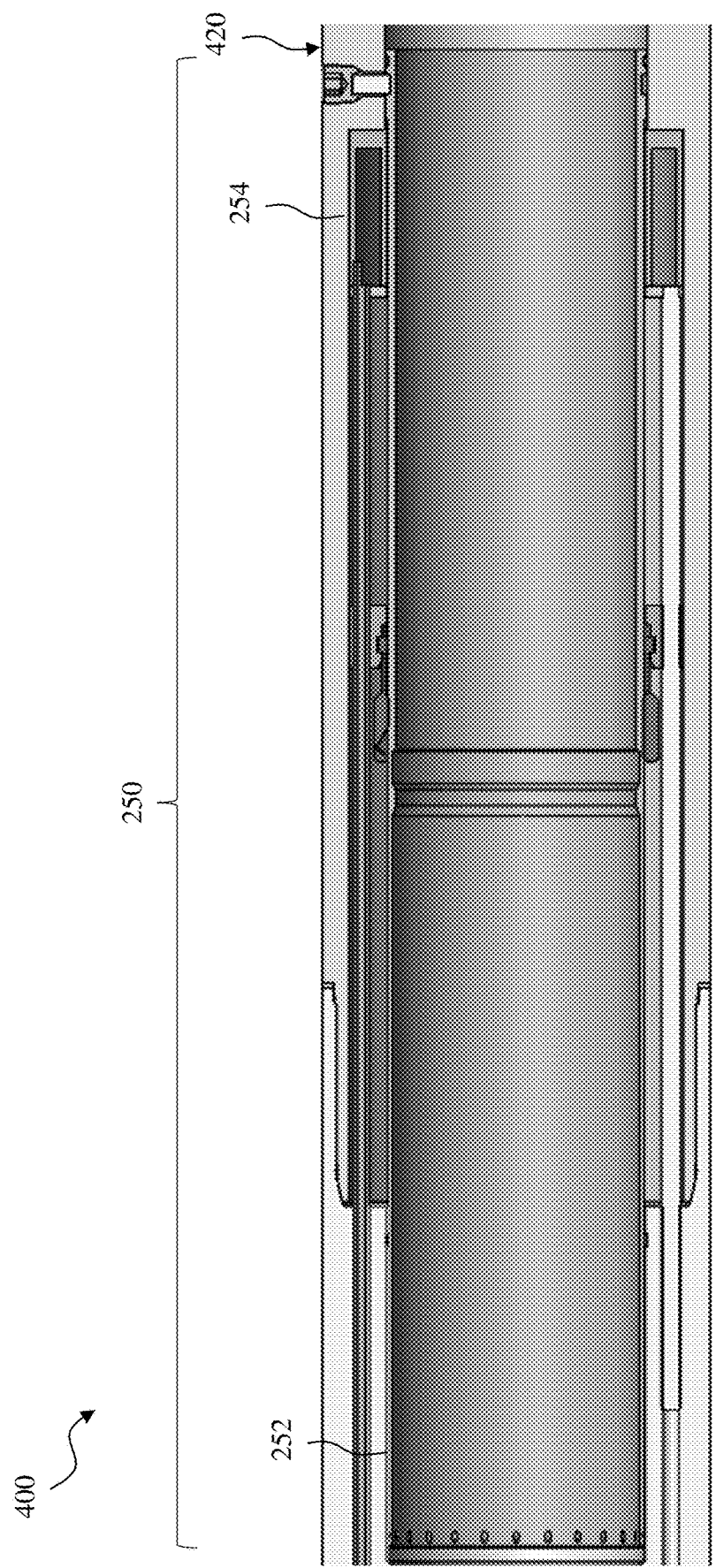
Figure 5A:
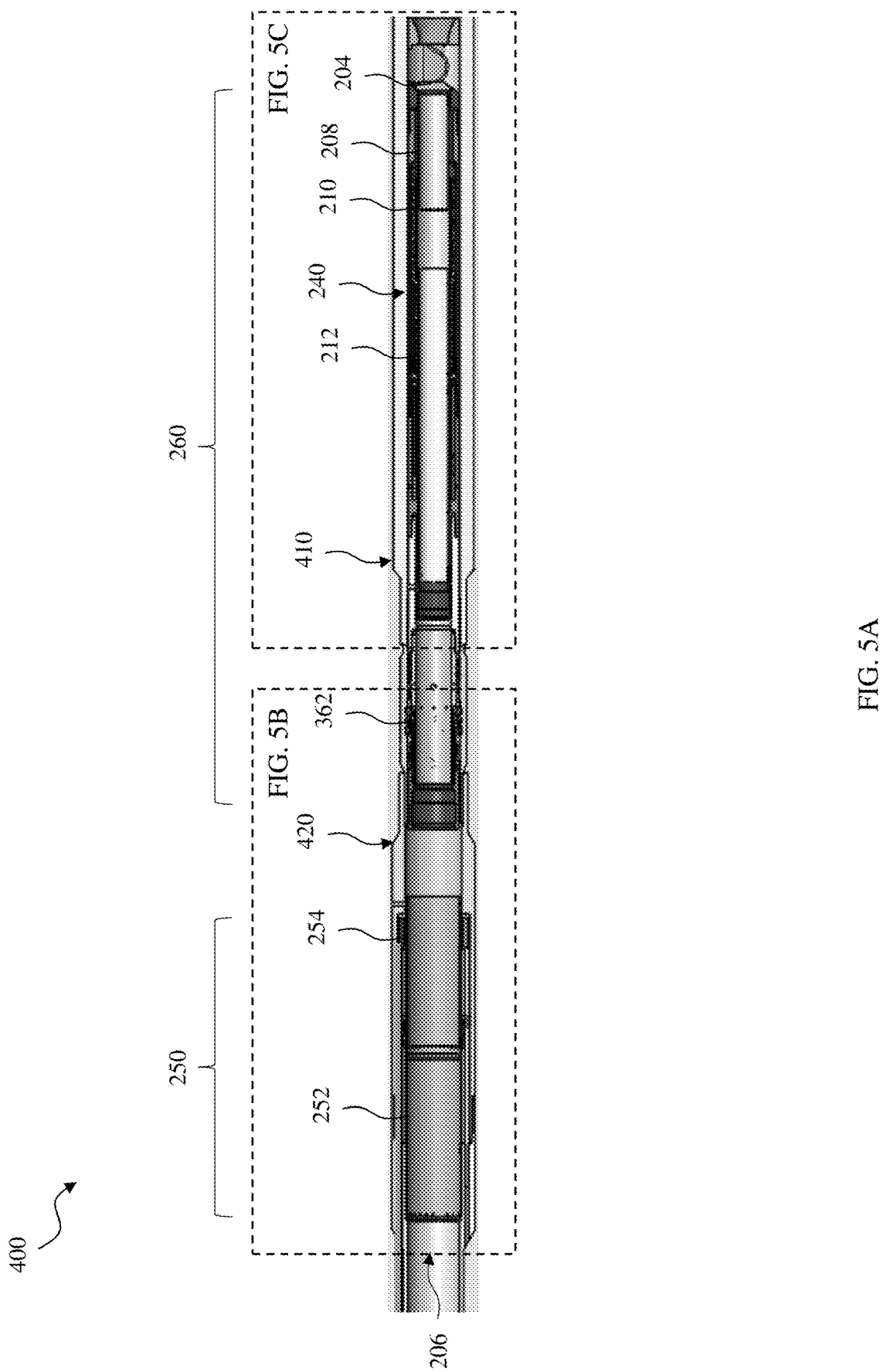
Figure 5B:
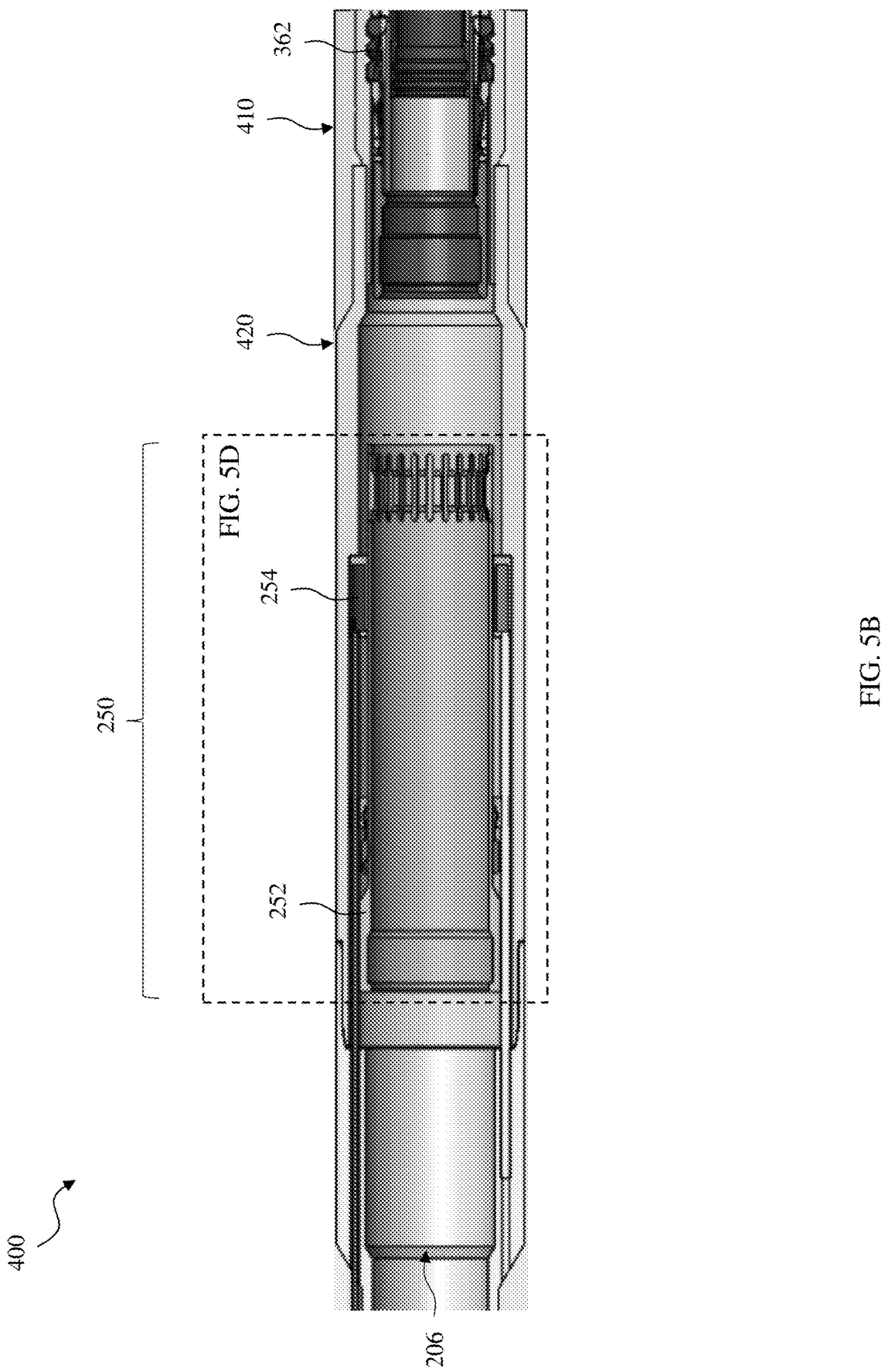
Figure 5C:
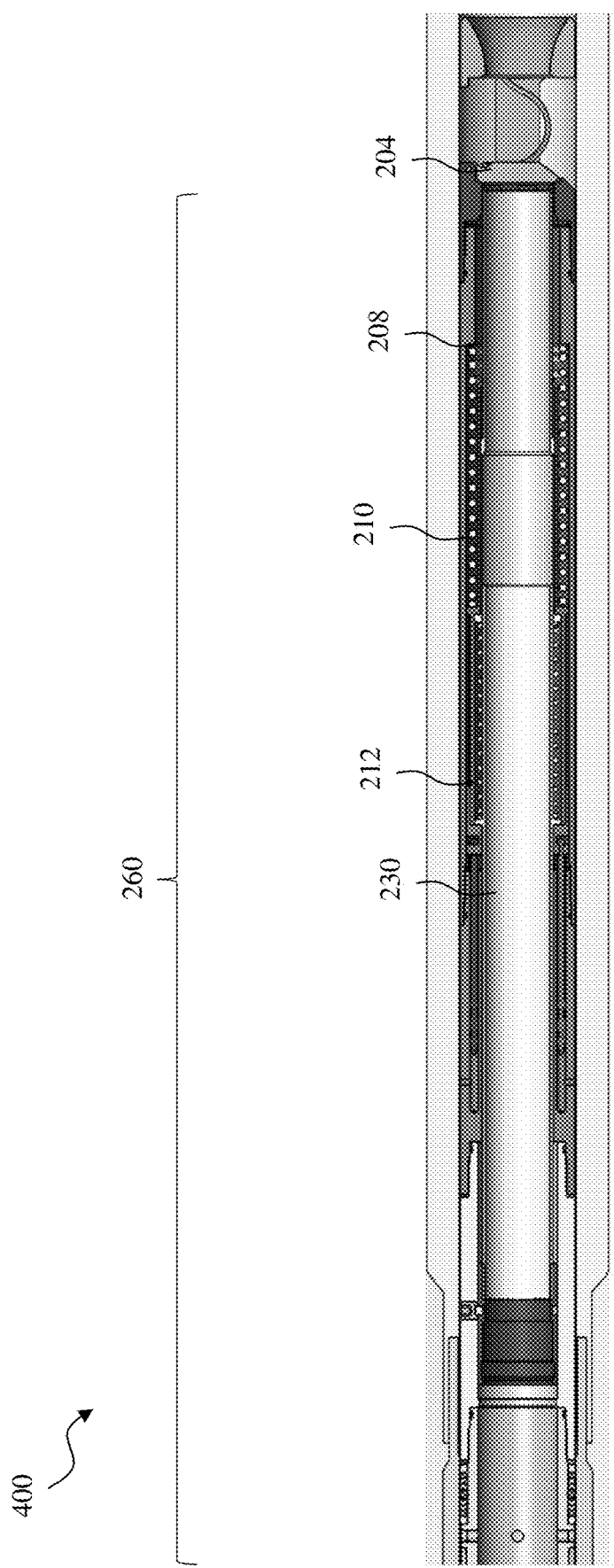
Figure 5D:
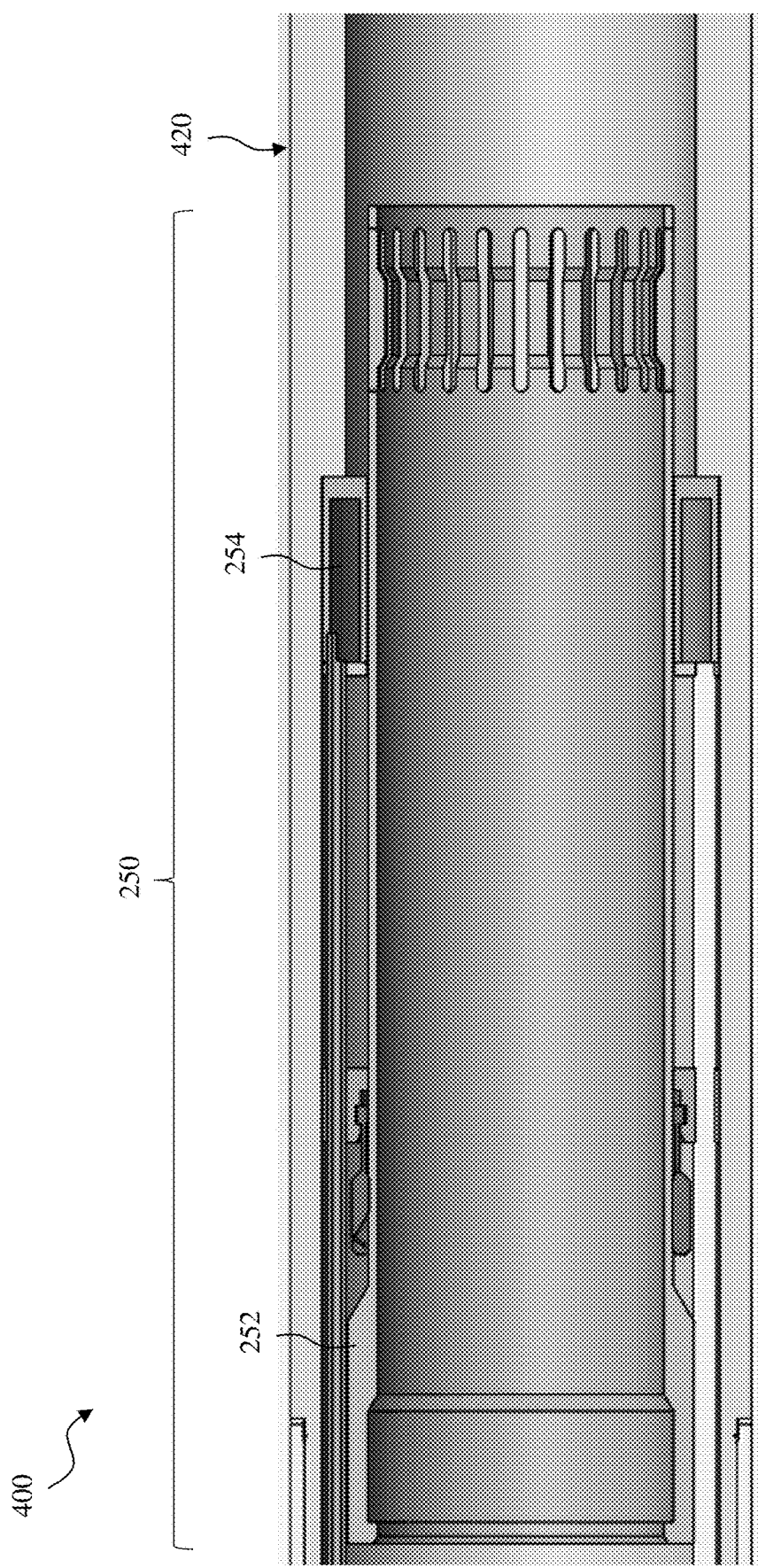
Figure 6A:
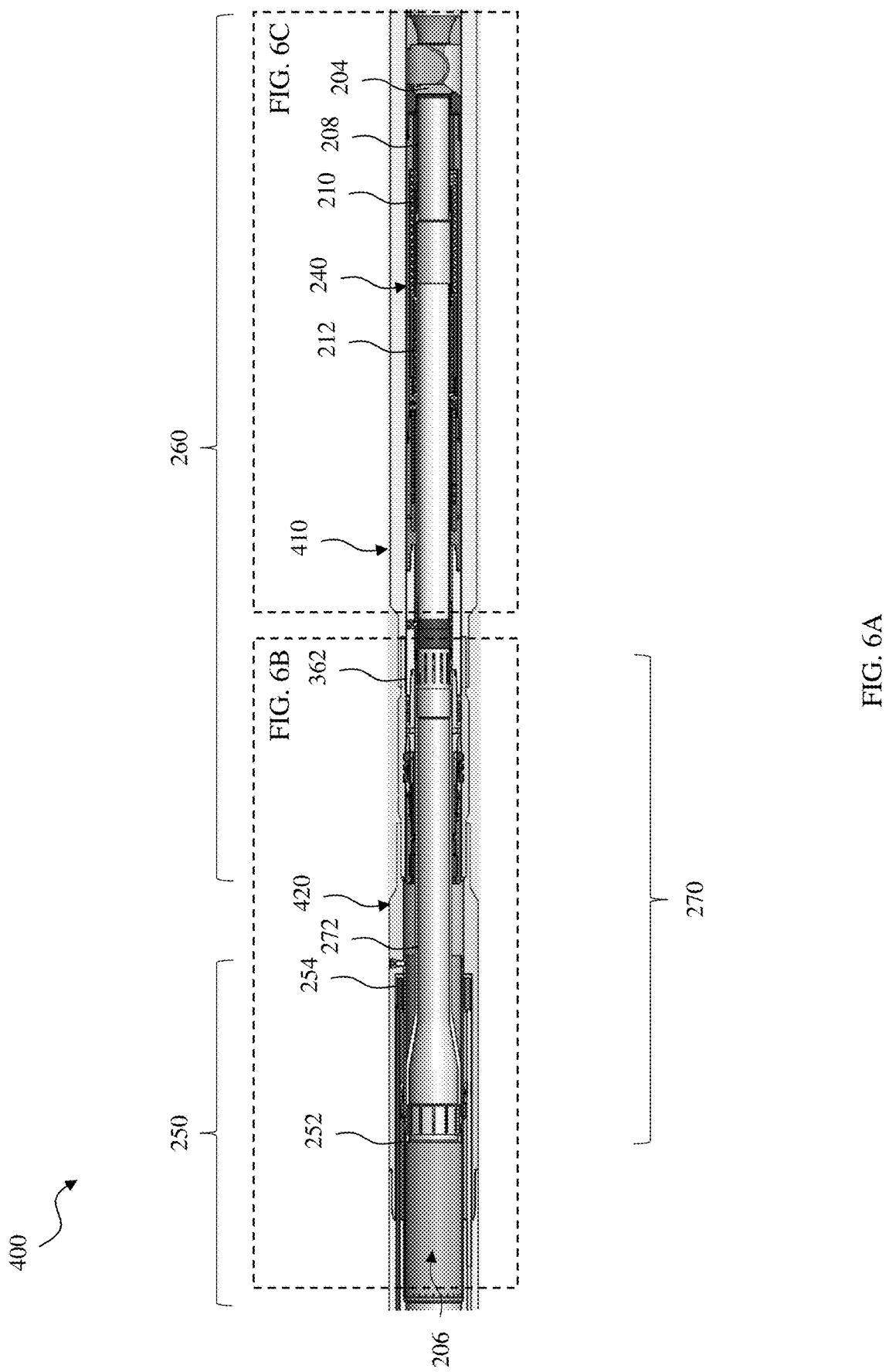
Figure 6C:
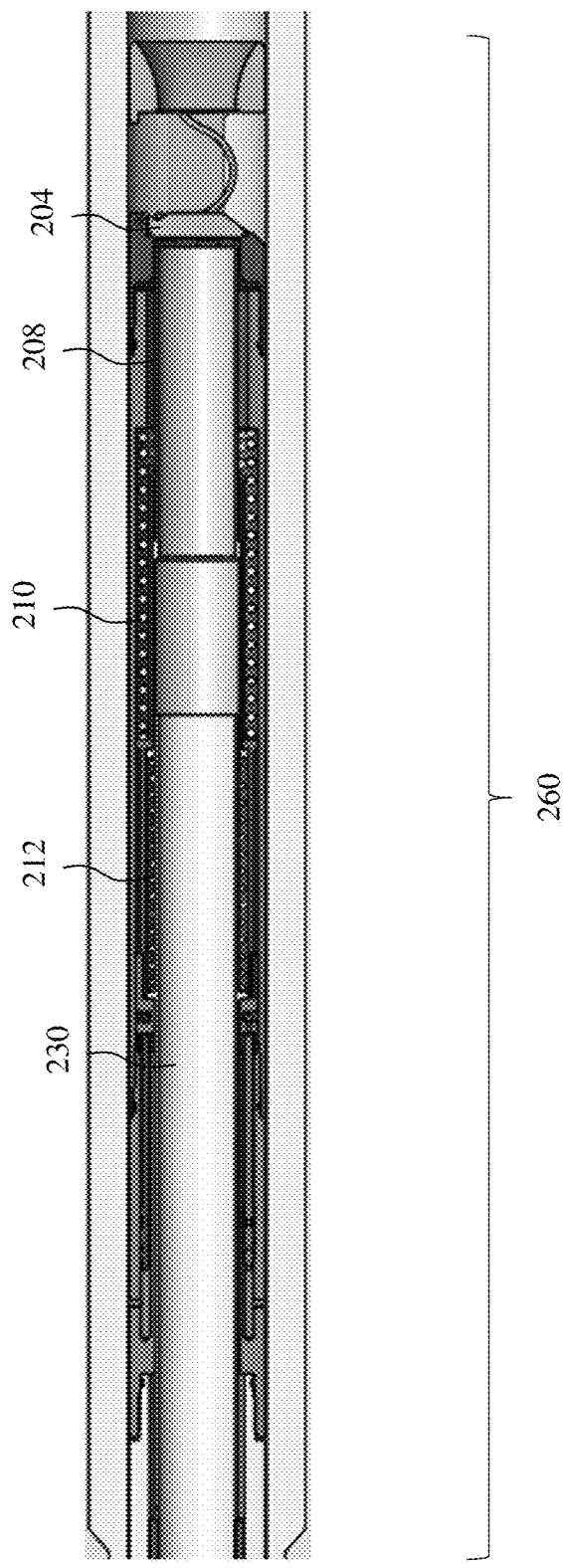
Figure 6D:
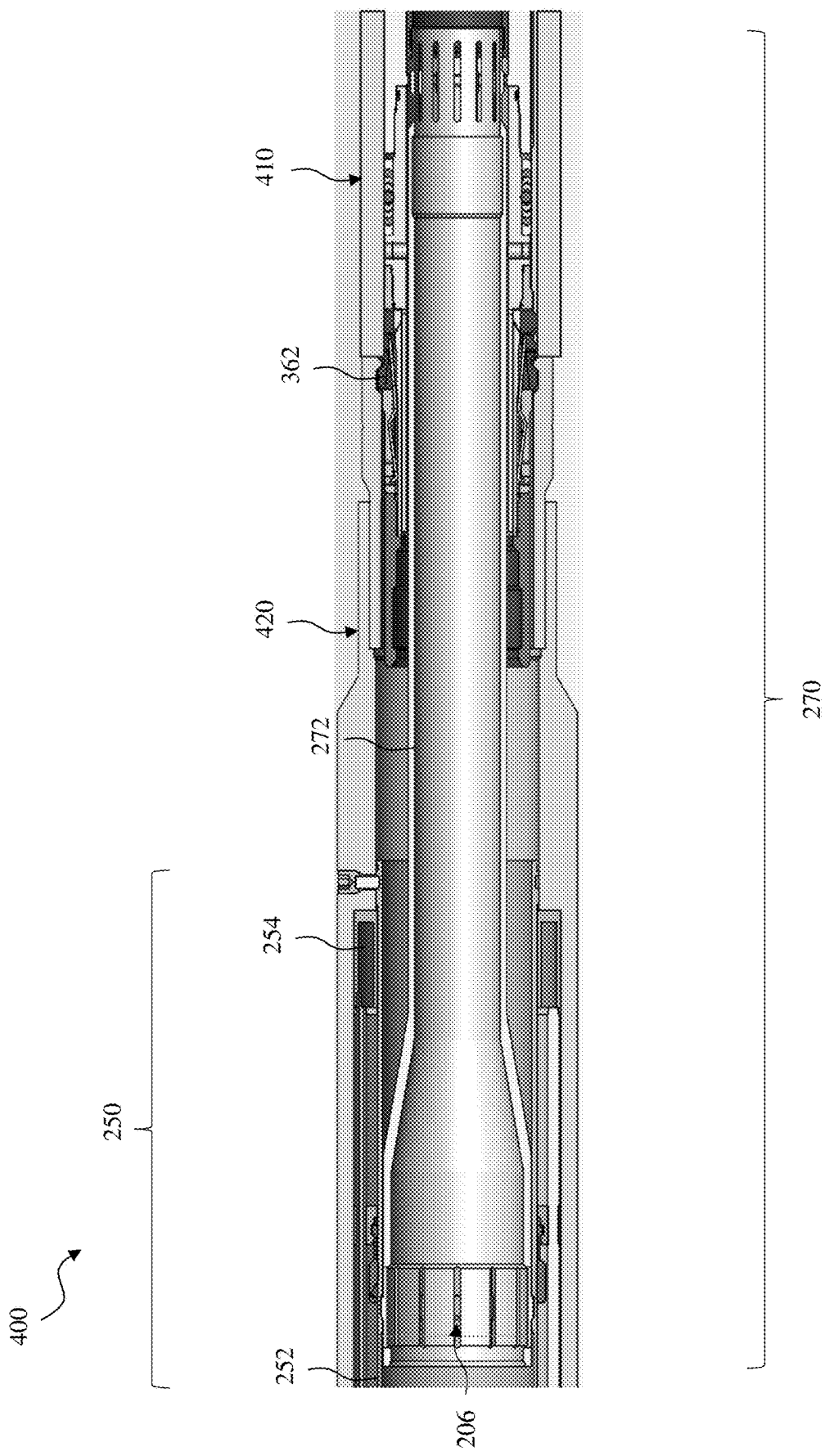
Figure 7A:
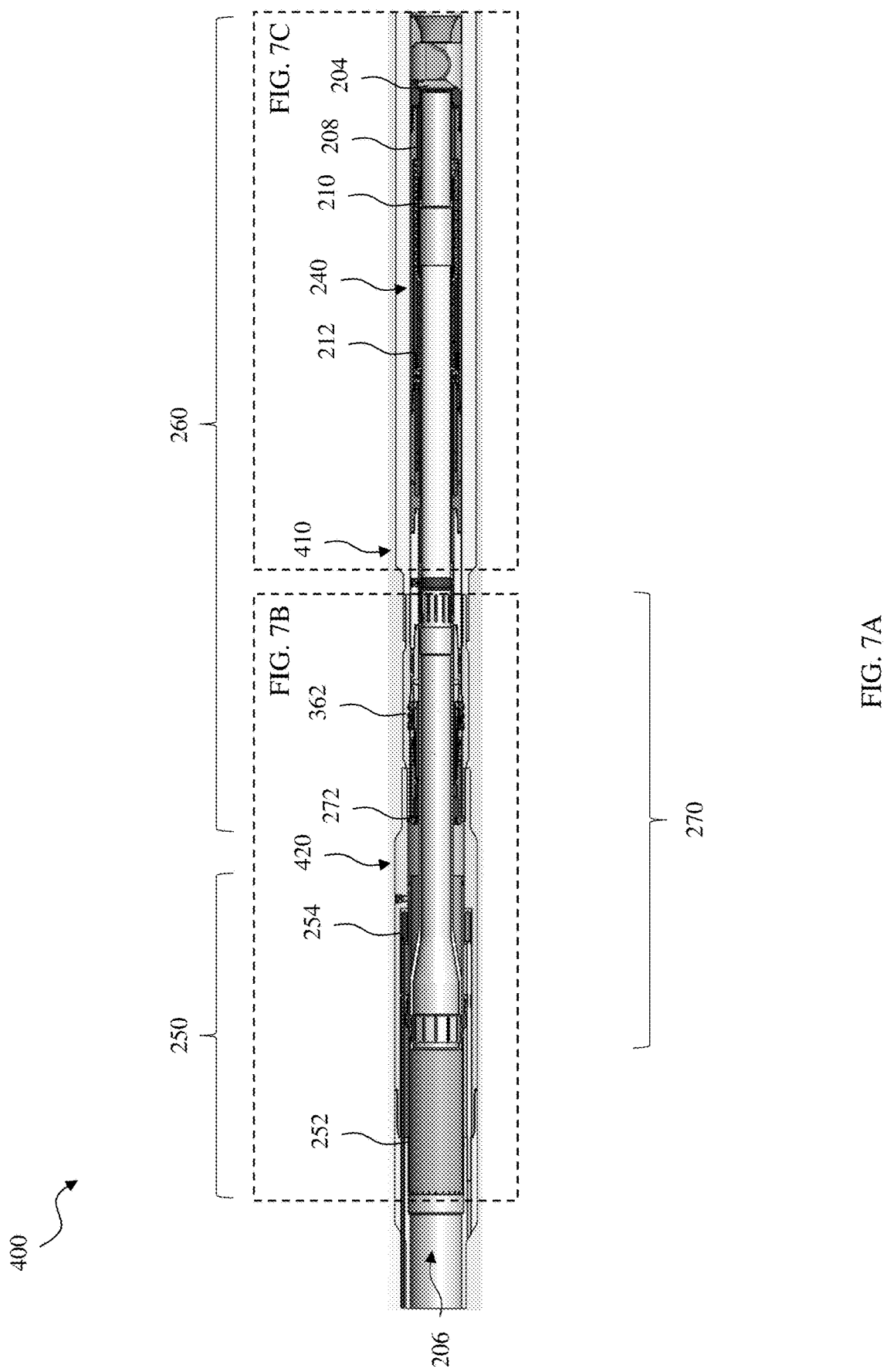
Figure 7B:
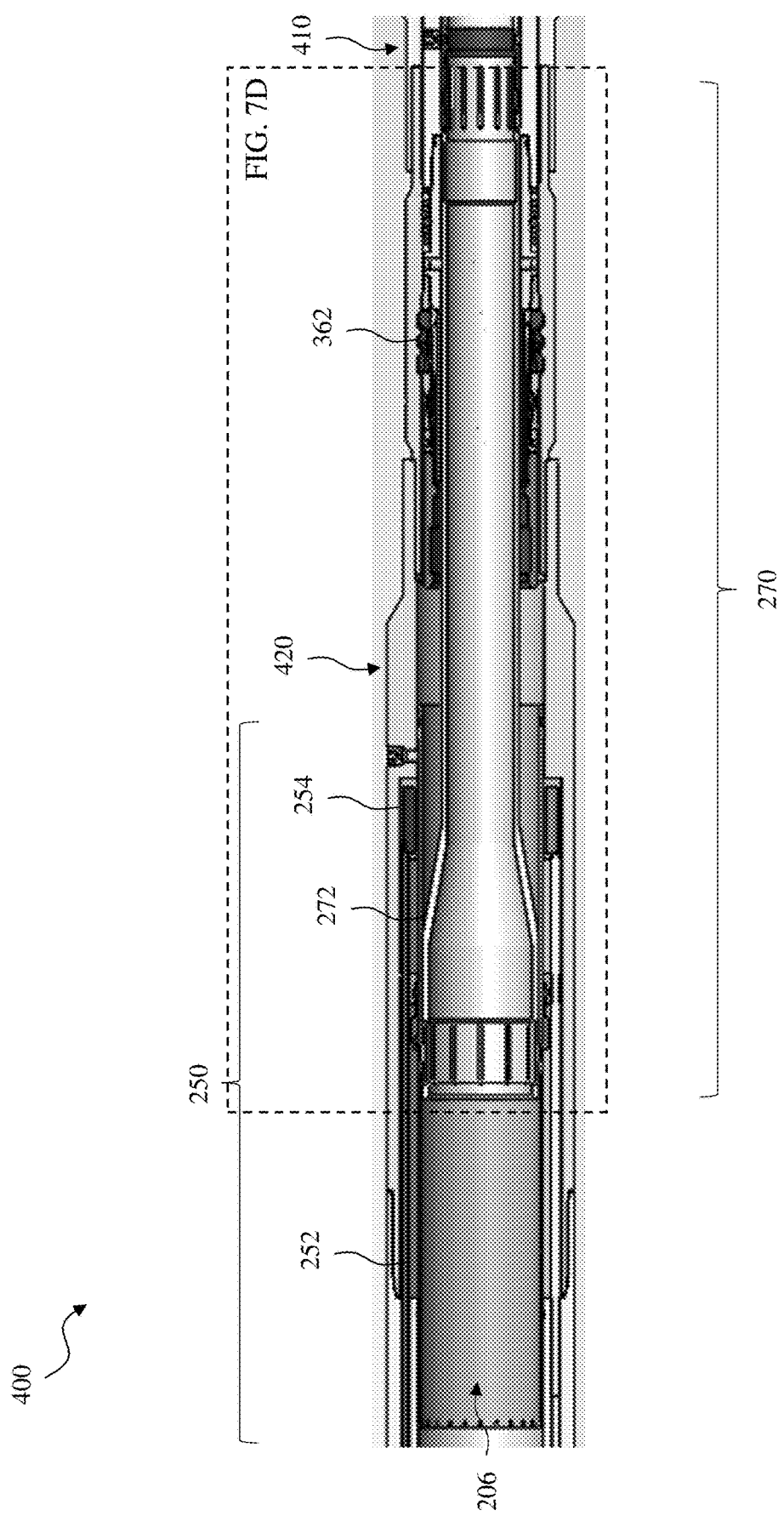
Figure 7C:
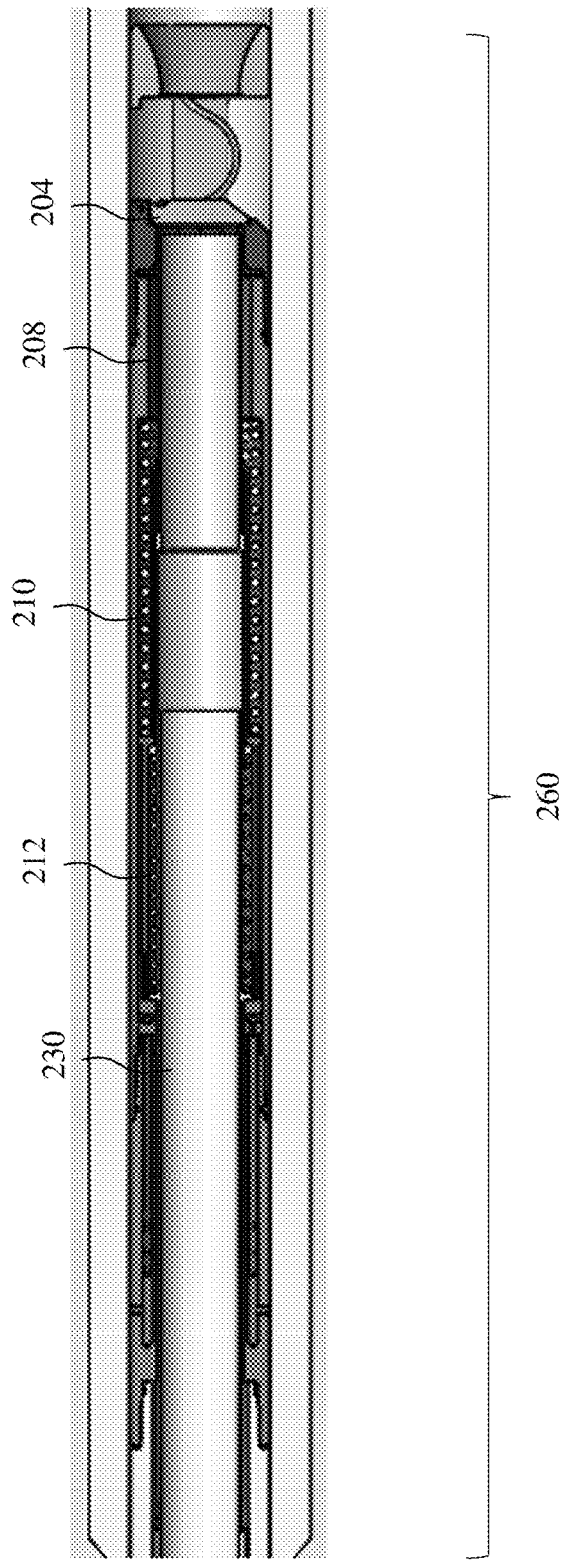
Figure 7D:
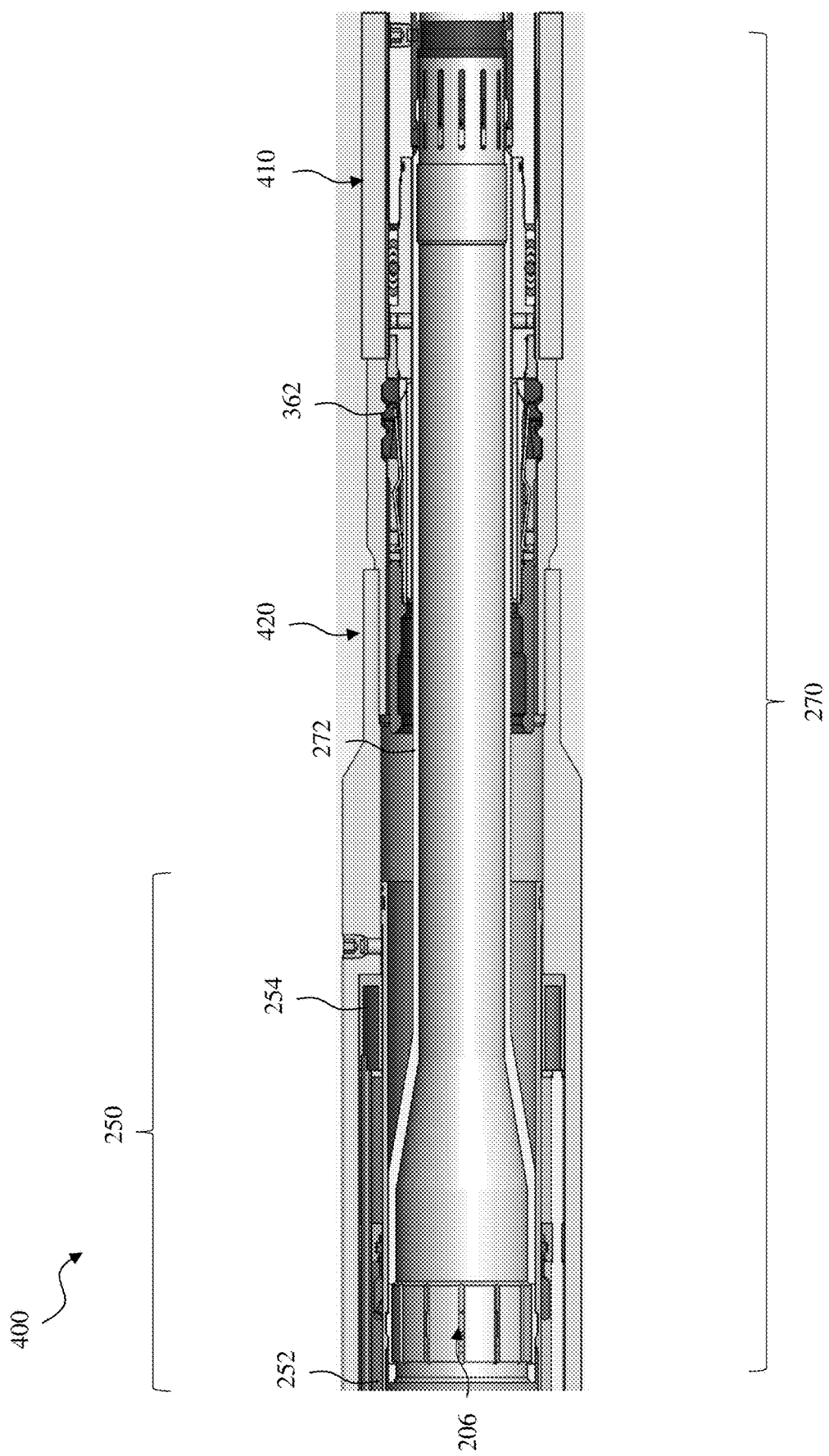
Figure 8A:
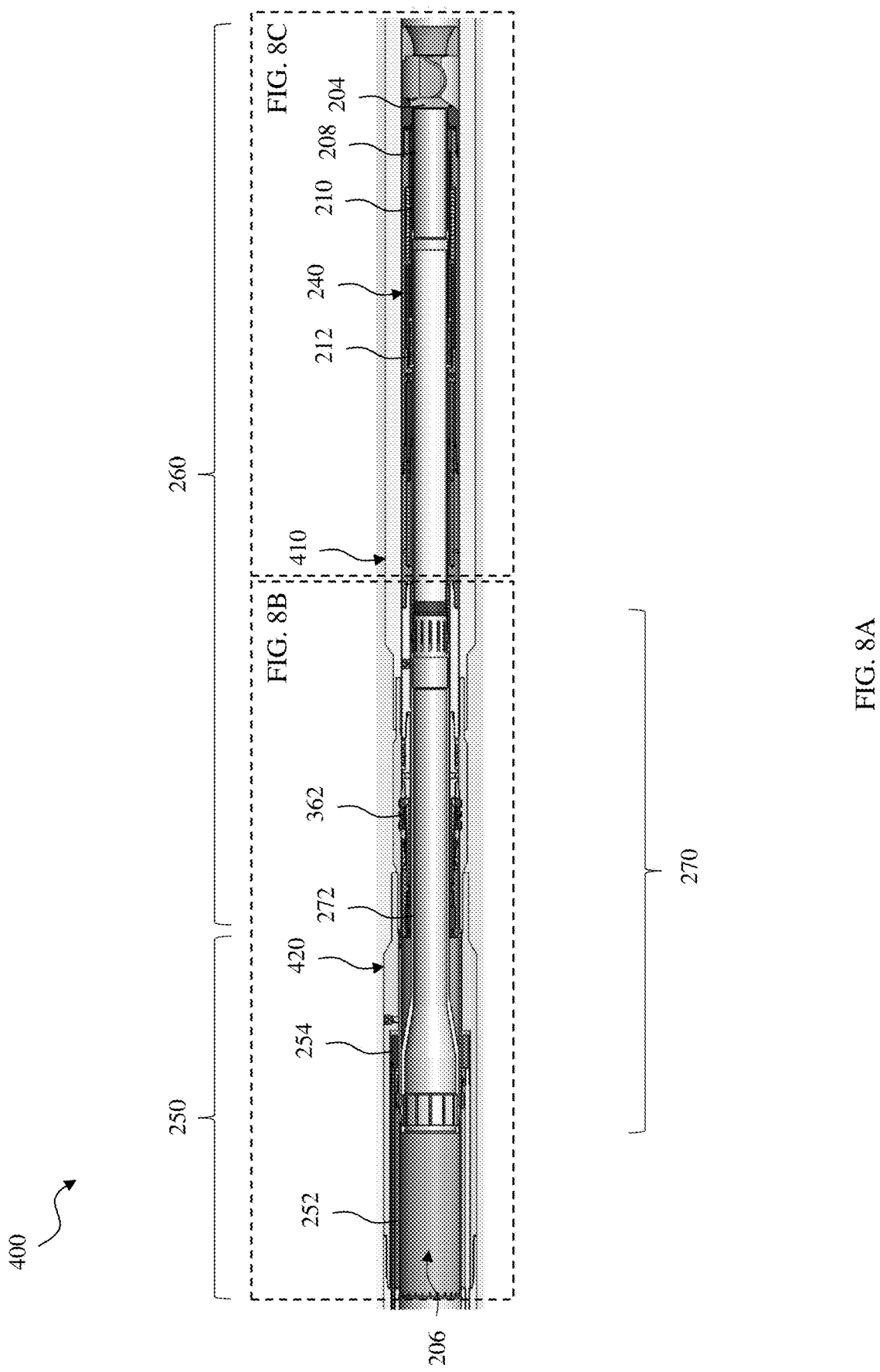
Figure 8B:
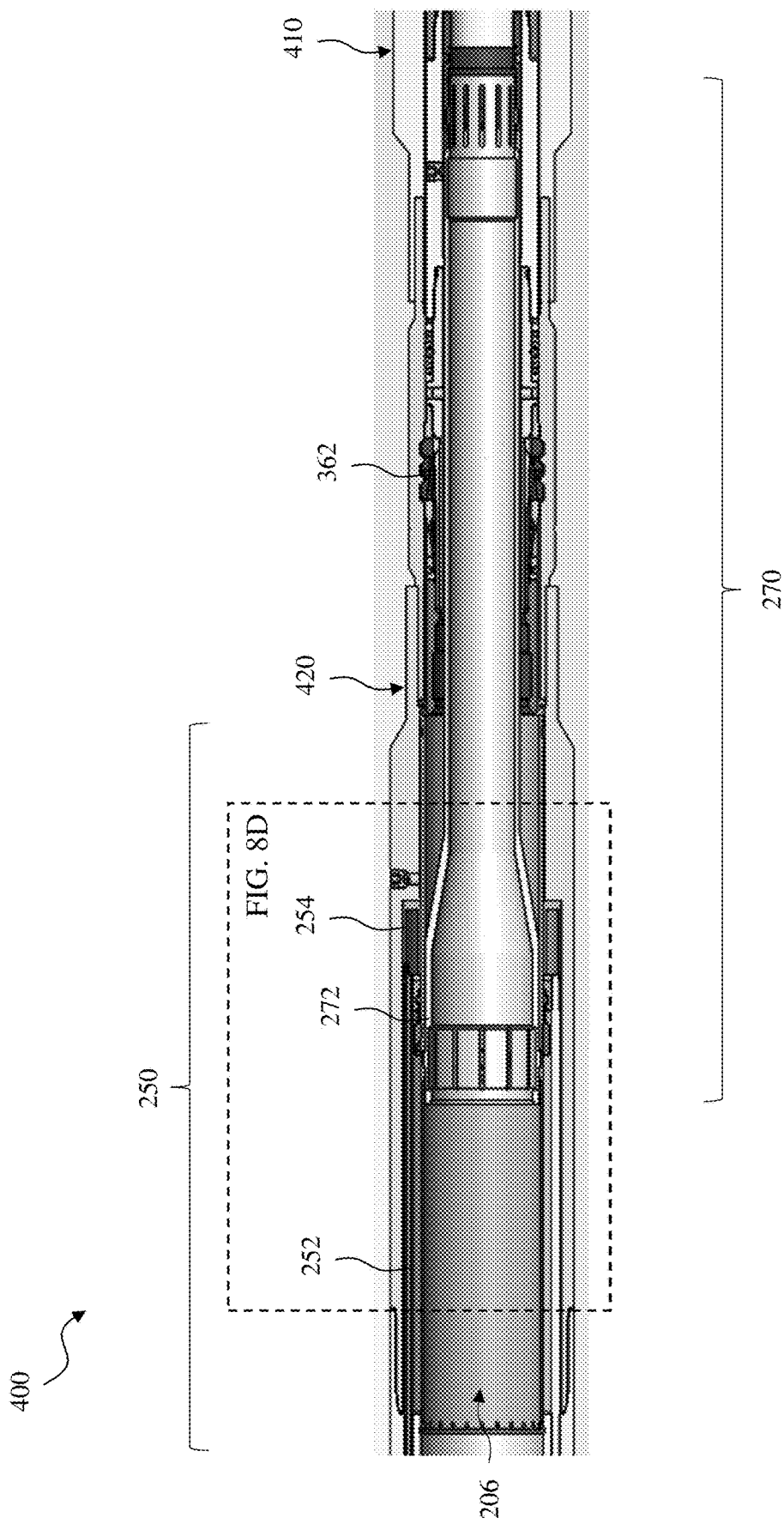
Figure 8C:
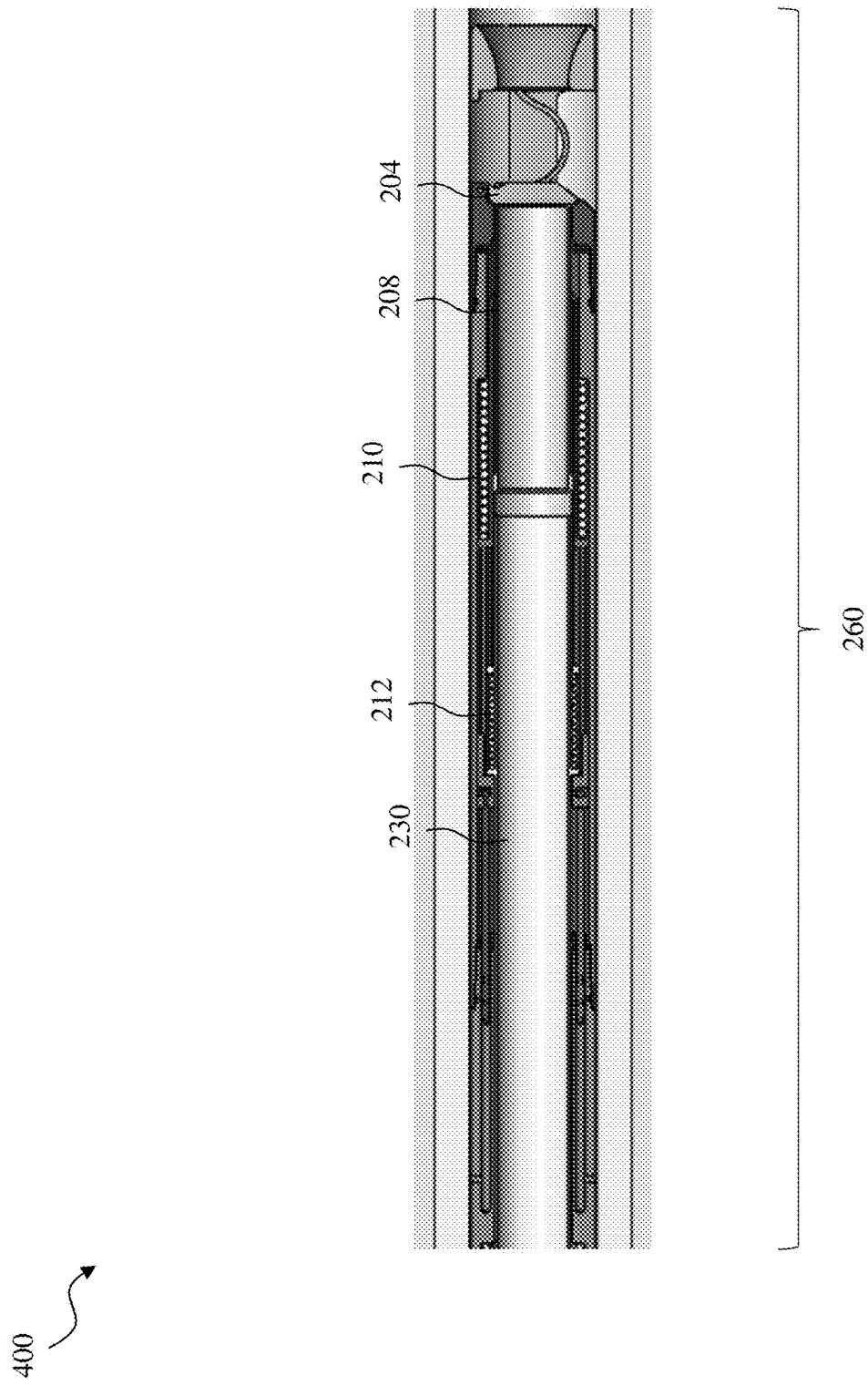
Figure 8D:
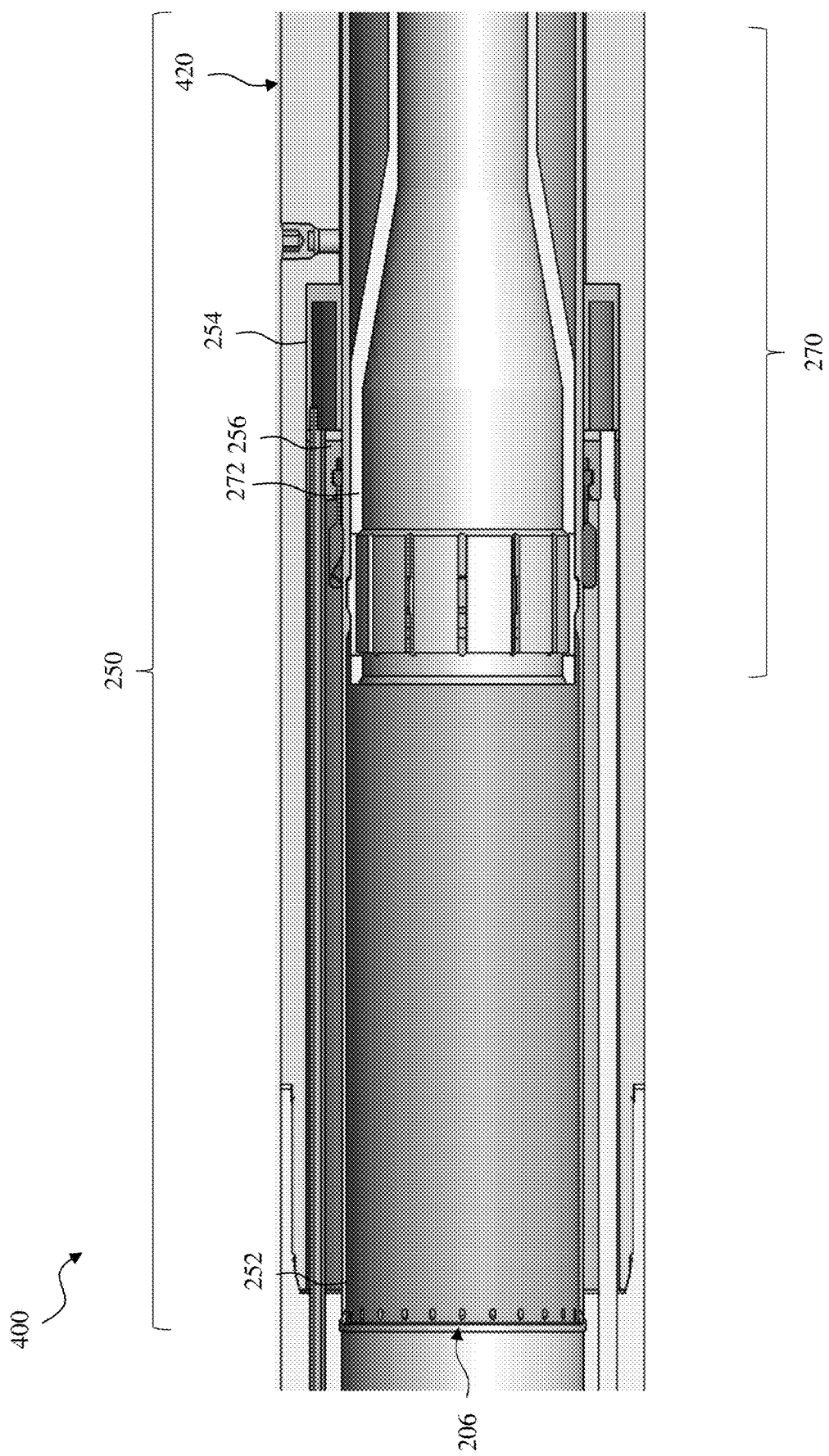
Figure 9B:
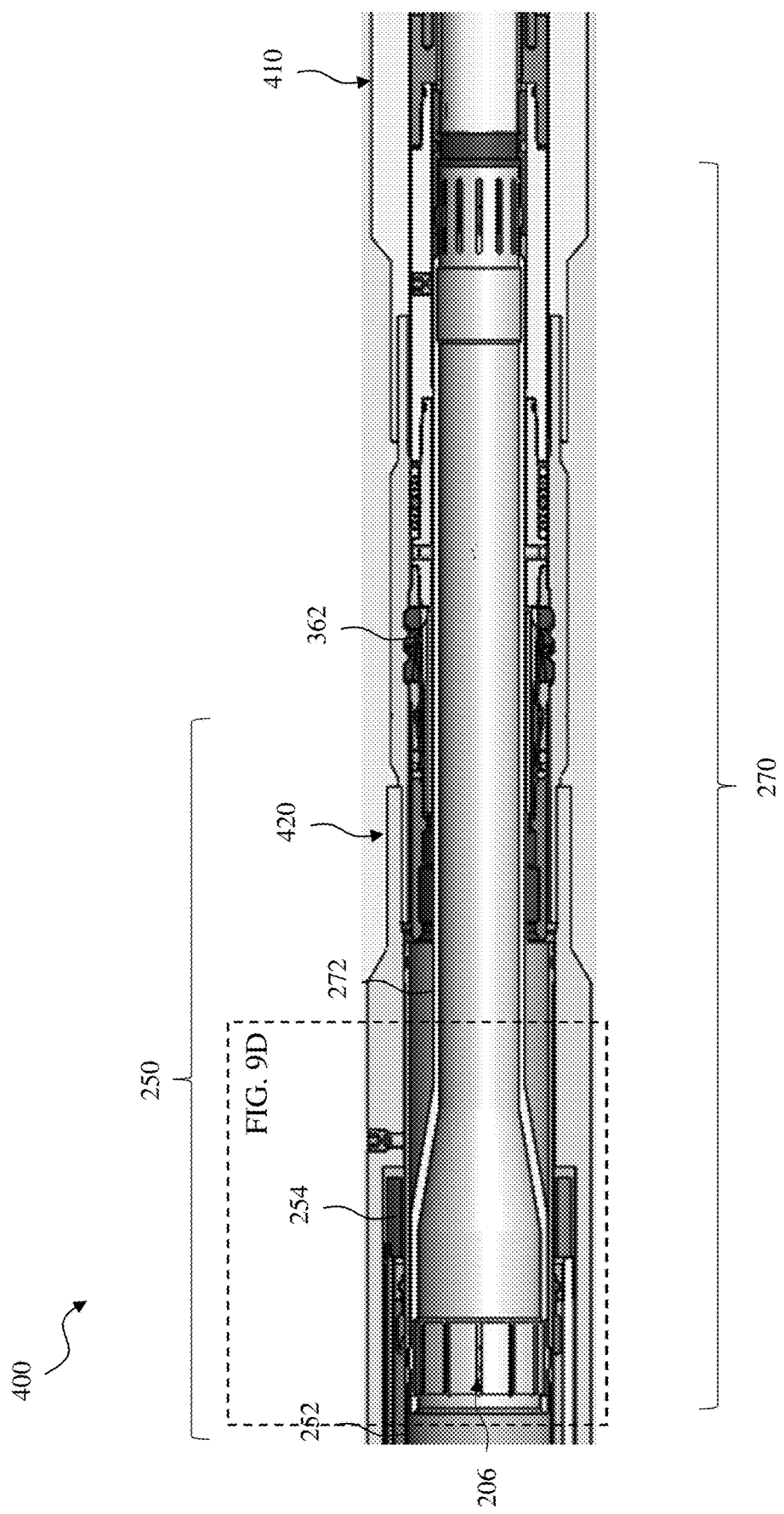
Figure 9C:
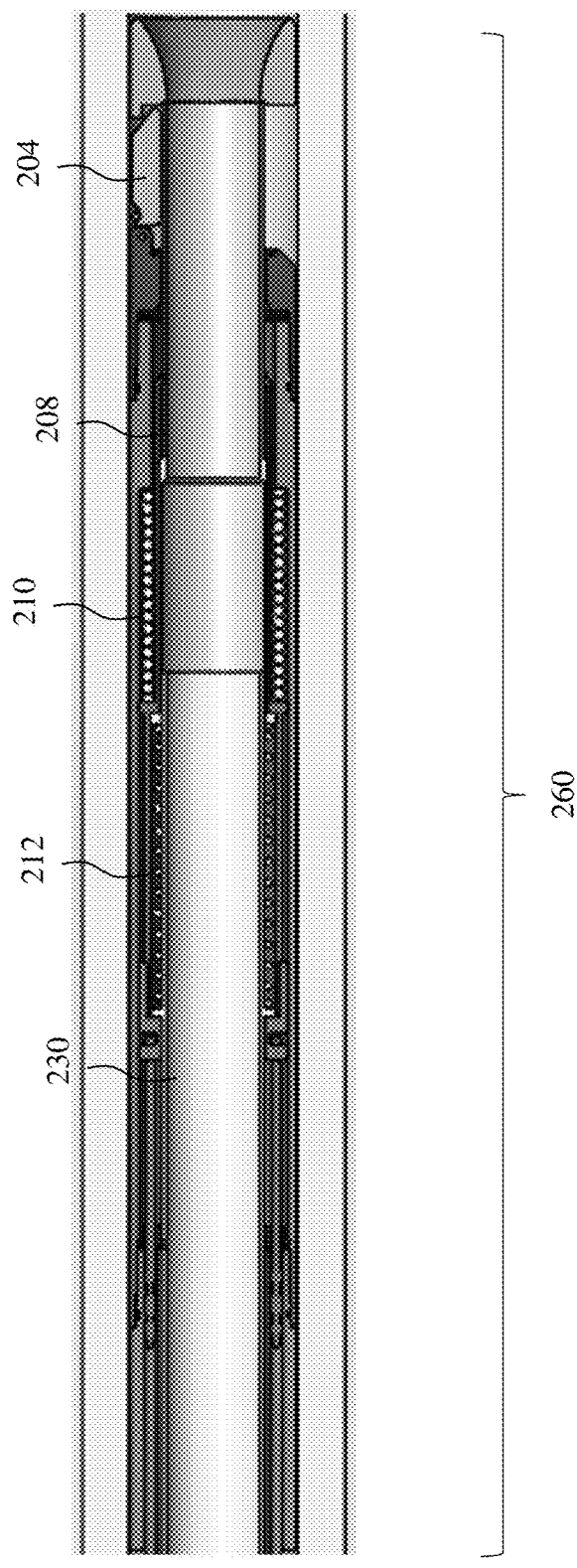
Figure 9D:
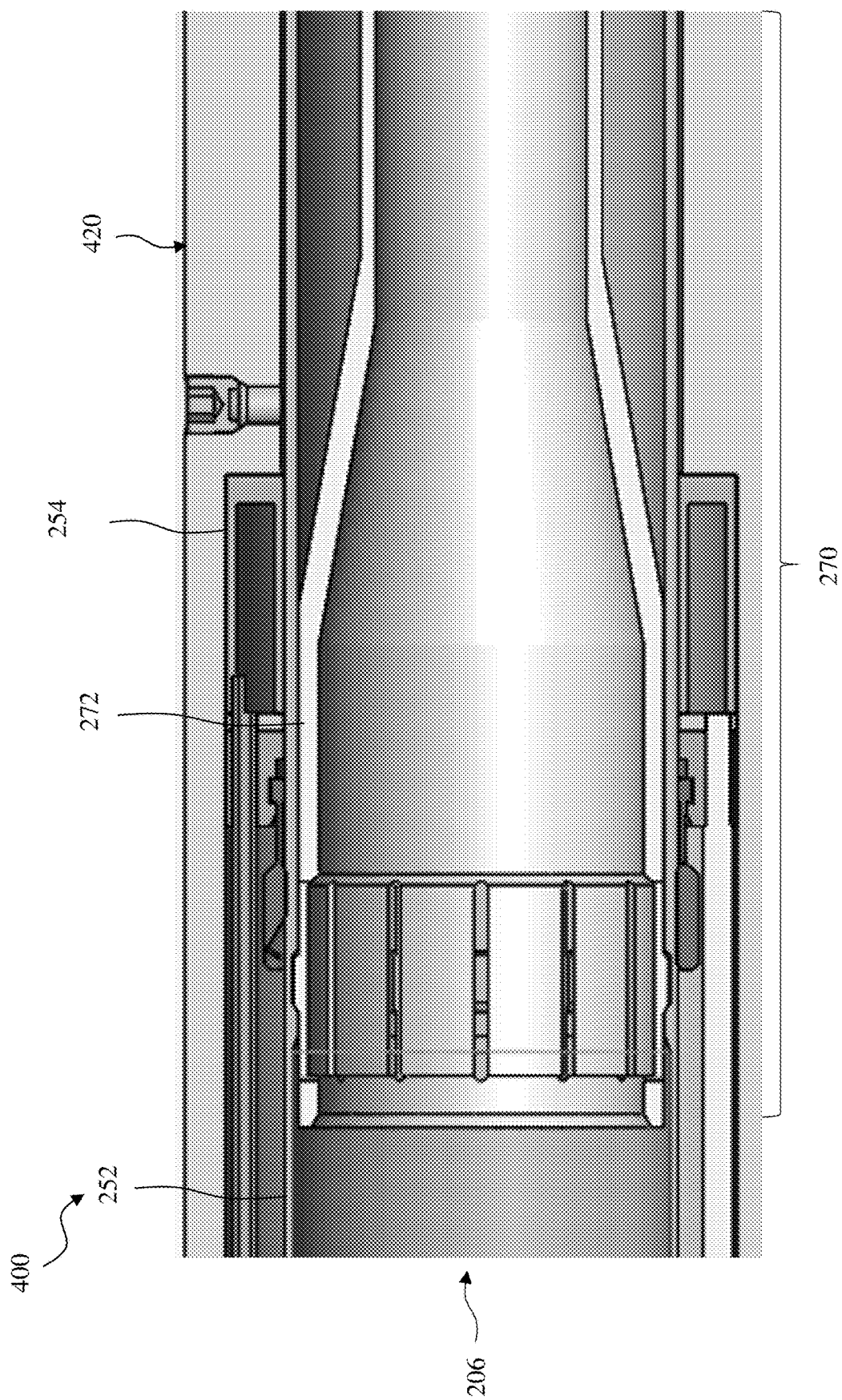
Figure 10B:
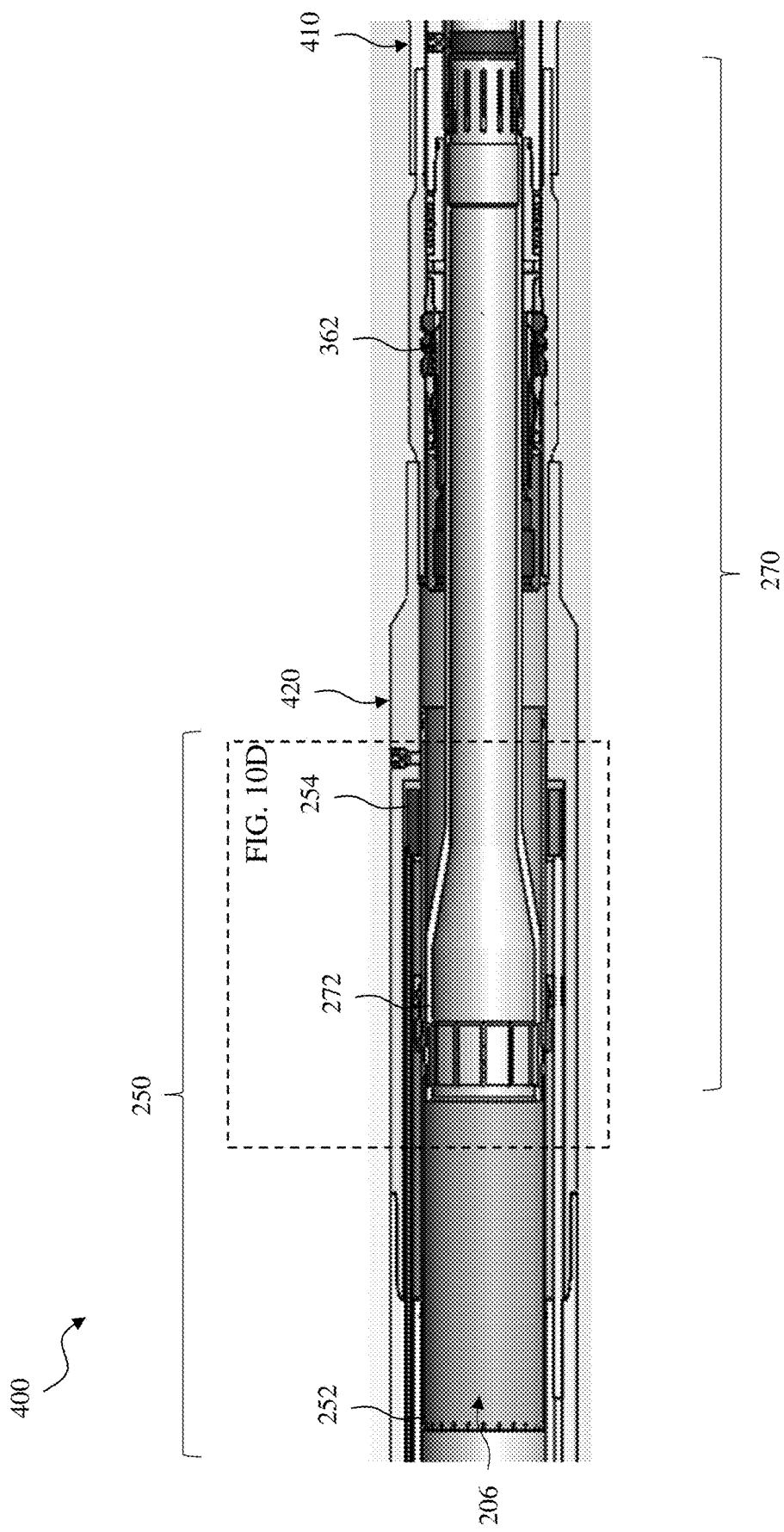
Figure 10C:
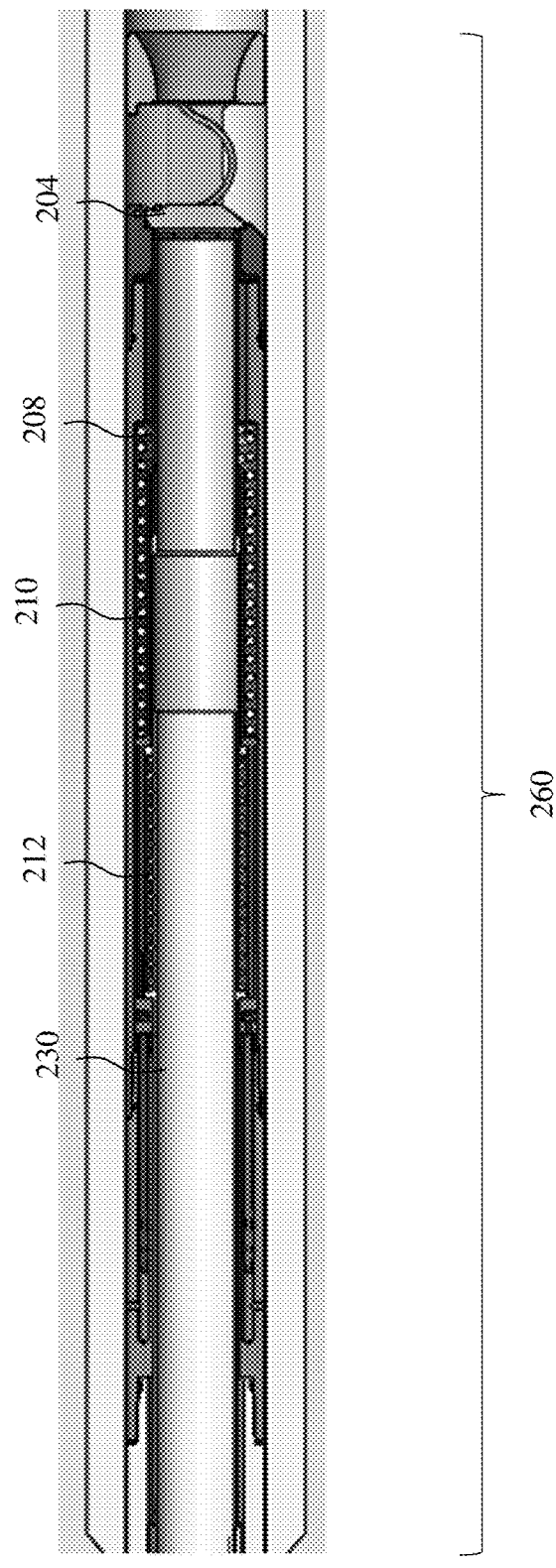
Figure 10D:
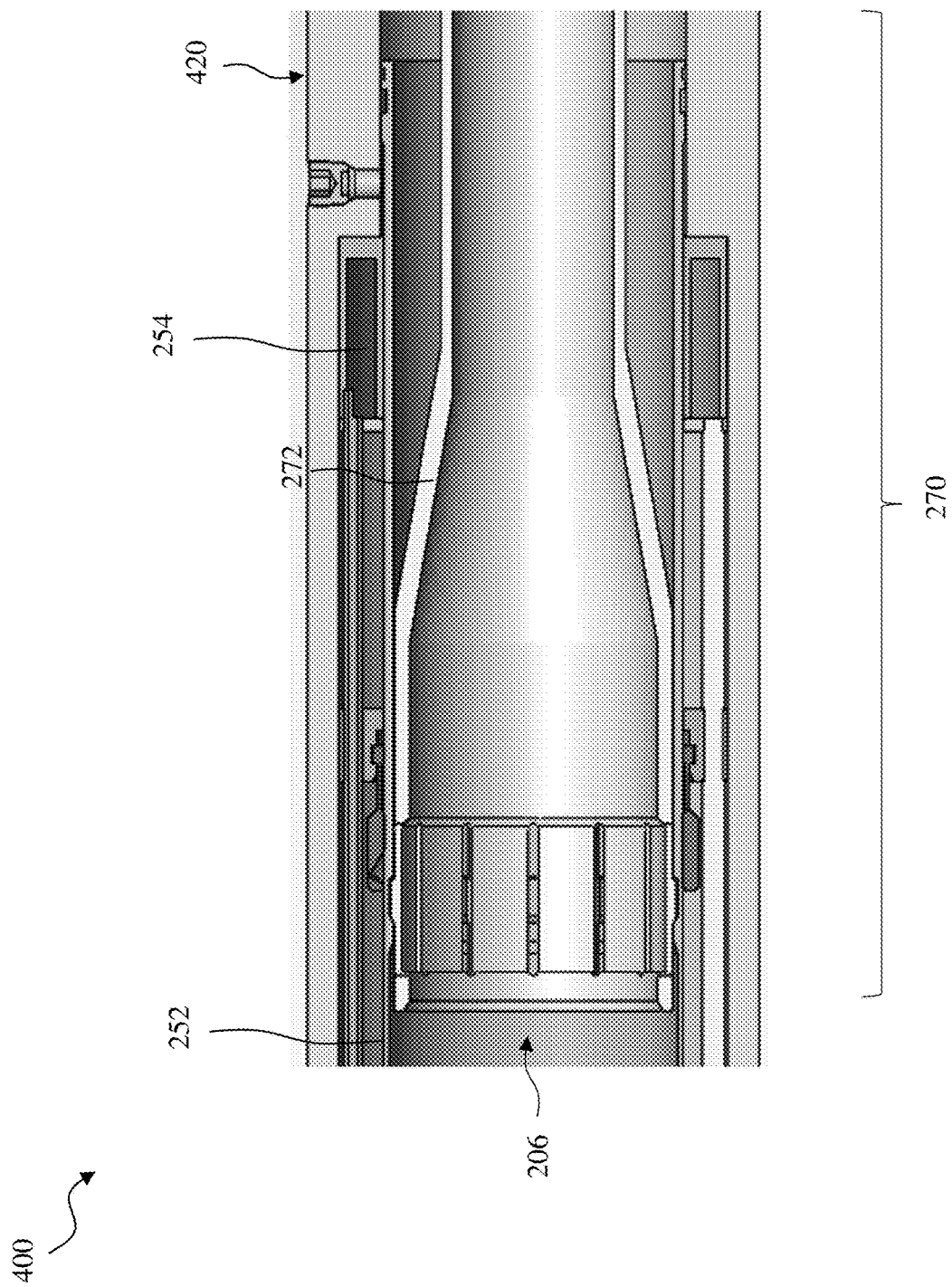

Turning now to FIGS. 3A through 3D, illustrated are different views of a safety valve 300 designed, manufactured and/or operated according to one or more alternative embodiments of the disclosure. The safety valve 300 of FIGS. 3A through 3D is similar in many respects to the safety valve 200 of FIGS. 2A through 2C. Accordingly, like reference numbers have been used to illustrate similar, if not identical, features. FIGS. 3A through 3D illustrate the safety valve 300 in its operational state, thus each of the first portion 250, the second portion 260 and the third portion 270 are coupled together and fixed within the tubular. For example, as illustrated, a latching mechanism 362 of the second portion 260 axially fixes the second portion 260 within the tubular (e.g., tubular of a TRSV in one embodiment). Furthermore, the mechanical connecting apparatus 272 of the third portion 270 axially fixes the sliding sleeve 252 of the first portion 250 to the bore flow management actuator 240 (e.g., translating sleeve assembly 230) of the second portion 260. Thus, any axial movement of the bore flow management actuator 240 (e.g., translating sleeve assembly 230), as discussed above, with result in a similar axial movement of the sliding sleeve 252. As shown in FIG. 3D, profiles (e.g., uphole mechanical connecting apparatus profile 274 and downhole mechanical connecting apparatus profile 276) of the mechanical connecting apparatus 272 engage with associated profiles (e.g., sliding sleeve profile 258 and profile 209, respectively) of the bore flow management actuator 240 (e.g., translating sleeve assembly 230) to axially fix the sliding sleeve 252 of the first portion 250 to the bore flow management actuator 240 (e.g., translating sleeve assembly 230) of the second portion 260.

Turning now to FIGS. 4A through 10D, illustrated are various different installation states, each with various different views, of a safety valve 400 designed, manufactured and/or operated according to one or more alternative embodiments of the disclosure. The safety valve 400 of FIGS. 4 through 10D, is similar in many respects to the safety valve 300 of FIGS. 3A through 3D. Accordingly, like reference numbers have been used to illustrate similar, if not identical, features.

FIGS. 4A through 4D illustrate the safety valve 400 in its original run-in-hole state, and thus at this stage the safety valve 400 only includes a safety valve sub 420 coupled to the TRSV 410. The safety valve sub 420, in this embodiment, includes the first portion 250 (e.g., having the sliding sleeve 252 and the electromagnetic assembly 254). In contrast, FIGS. 5A through 5D illustrate the safety valve 400 after the TRSV 410 is no longer working properly and/or has failed. Accordingly, the safety valve 400 of FIGS. 5A through 5D additionally includes the second portion 260, for example including the flow tube main body 208 and valve closure mechanism 204.

FIGS. 6A through 6D, however, illustrate the completed safety valve 400, and thus the safety valve 400 of FIGS. 6A through 6D includes the third portion 270 (e.g., including the mechanical connecting apparatus 272). In the embodiment of FIGS. 6A through 6D, the third portion 270 is coupled to the sliding sleeve 252 of the first portion 250, but has yet to be coupled with the bore flow management actuator 240 (e.g., translating sleeve assembly 230) of the second portion 260. Turning to FIGS. 7A through 7D, the third portion 270 is now coupled to the bore flow management actuator 240 (e.g., translating sleeve assembly 230) of the second portion 260, and thus the bore flow management actuator 240 (e.g., translating sleeve assembly 230) and the sliding sleeve 252 are axially fixed to one another (e.g., via the mechanical connecting apparatus 272). The progression of FIGS. 4A through 7D illustrates how the safety valve 400 could be installed in accordance with one or more embodiments of the disclosure.

Turning now to FIGS. 8A through 8D, the completed safety valve 400 has tubing pressure below the valve closure mechanism 204. Furthermore, the magnetic target 256 of the sliding sleeve 252 is closer to the electromagnetic assembly 254. At this stage, the valve closure mechanism 204 is ready to open once pressure is balanced from above.

Turning now to FIGS. 9A through 9D, the pressure is balanced, and thus the flow tube main body 208 moves axially down to open the valve closure mechanism 204. At this stage, the flow tube main body 208 and sliding sleeve 252 are held in this position by the electromagnetic assembly 254 and the magnetic target 256.

Turning now to FIGS. 10A through 10D, the electromagnetic assembly 254 loses power, and thus the power spring 210 of the second portion 260 pushes the flow tube main body 208 uphole, allowing the valve closure mechanism 204 to close.

Aspects disclosed herein include:

A. A safety valve, the safety valve including: 1) a first portion, the first portion including a safety valve sub having a sliding sleeve, the first portion configured to be run-in-hole as part of wellbore tubing; 2) a second portion, the second portion including a valve closure mechanism and a bore flow management actuator, the bore flow management actuator configured to slide from a first initial state to a first subsequent state to move the valve closure mechanism between a first closed state and a first open state, the second portion configured to be run-in-hole after the first portion; and 3) a third portion, the third portion including a mechanical connecting apparatus, the third portion configured to be run-in-hole after the second portion, and further wherein the mechanical connecting apparatus is configured to couple with the sliding sleeve of the first portion and the bore flow management actuator of the second portion to axially fix together the sliding sleeve and at least a portion of the bore flow management actuator.

B. A well system, the well system including: 1) a wellbore extending through one or more subterranean formations; 2) production tubing disposed in the wellbore; and 3) a safety valve disposed in the wellbore, the safety valve including:) a first portion, the first portion including a safety valve sub having a sliding sleeve, the first portion configured to be run-in-hole as part of the production tubing; b) a second portion, the second portion including a valve closure mechanism and a bore flow management actuator, the bore flow management actuator configured to slide from a first initial state to a first subsequent state to move the valve closure mechanism between a first closed state and a first open state, the second portion configured to be run-in-hole after the first portion; and c) a third portion, the third portion including a mechanical connecting apparatus, the third portion configured to be run-in-hole after the second portion, and further wherein the mechanical connecting apparatus is configured to couple with the sliding sleeve of the first portion and the bore flow management actuator of the second portion to axially fix together the sliding sleeve and at least a portion of the bore flow management actuator.

C. A method, the method including: 1) positioning a first portion within a wellbore extending through one or more subterranean formations, the first portion including a safety valve sub having a sliding sleeve; 2) positioning a second portion within the wellbore after positioning the first portion within the wellbore, the second portion including a valve closure mechanism and a bore flow management actuator, the bore flow management actuator configured to slide from a first initial state to a first subsequent state to move the valve closure mechanism between a first closed state and a first open state, the second portion configured to be run-in-hole after the first portion; and 3) positioning a third portion within the wellbore after positioning the second portion within the wellbore, the third portion including a mechanical connecting apparatus, wherein the mechanical connecting apparatus is configured to couple with the sliding sleeve of the first portion and the bore flow management actuator of the second portion to axially fix together the sliding sleeve and at least a portion of the bore flow management actuator.

Aspects A, B, and C may have one or more of the following additional elements in combination: Element 1: wherein the safety valve sub additionally includes an electromagnetic assembly and a magnetic target configured to magnetically couple with the electromagnetic assembly. Element 2: wherein the magnetic target is coupled to the sliding sleeve and the electromagnetic assembly is axially fixed with the wellbore tubing. Element 3: wherein the sliding sleeve includes a sliding sleeve profile and the mechanical connecting apparatus includes an uphole mechanical connecting apparatus profile, and further wherein the uphole mechanical connecting apparatus profile is configured to couple with the sliding sleeve profile to axially fix together the sliding sleeve and the mechanical connecting apparatus. Element 4: wherein the bore flow management actuator includes a bore flow management actuator profile and the mechanical connecting apparatus includes a downhole mechanical connecting apparatus profile, and further wherein the downhole mechanical connecting apparatus profile is configured to couple with the bore flow management actuator profile to axially together at least a portion of the bore flow management actuator and the mechanical connecting apparatus. Element 5: wherein the bore flow management actuator includes a flow tube main body and a translating sleeve assembly including a translating sleeve. Element 6: wherein the mechanical connecting apparatus is configured to couple with the sliding sleeve of the first portion and the translating sleeve of the second portion to axially fix together the sliding sleeve and the translating sleeve. Element 7: wherein the second portion further includes a lower valve assembly located proximate the valve closure mechanism and an upper valve assembly positioned distal the valve closure mechanism, and further wherein the bore flow management actuator includes a power spring disposed between the lower valve assembly and a translating sleeve shoulder of the translating sleeve. Element 8: wherein the second portion further includes a nose spring disposed between the translating sleeve assembly and a flow tube shoulder of the flow tube main body. Element 9: wherein the first portion has a first portion minimum inside diameter ($ID_1$) and the second portion has a second portion maximum outside diameter ($OD_2$), and further wherein the second portion maximum outside diameter ($OD_2$) is less than the first portion minimum inside diameter ($ID_1$) such that the second portion is configured to be run-in-hole after the first portion. Element 10: wherein the safety valve is a wireline retrievable safety valve (WLRSV), and further including a tubing retrievable safety valve (TRSV) disposed in the wellbore. Element 11: wherein the tubing retrievable safety valve (TRSV) forms part of the first portion. Element 12: further including coupling the mechanical connecting apparatus with the sliding sleeve of the first portion and the bore flow management actuator of the second portion to axially fix together the sliding sleeve and at least a portion of the bore flow management actuator. Element 13: wherein second portion forms a part of a wireline retrievable safety valve (WLRSV), and further including a tubing retrievable safety valve (TRSV) disposed in the wellbore. Element 14: wherein the tubing retrievable safety valve (TRSV) forms part of the first portion. Element 15: wherein the safety valve sub additionally includes an electromagnetic assembly and a magnetic target configured to magnetically couple with the electromagnetic assembly. Element 16: wherein the magnetic target is coupled to the sliding sleeve and the electromagnetic assembly is axially fixed with the wellbore tubing.

Those skilled in the art to which this application relates will appreciate that other and further additions, deletions, substitutions and modifications may be made to the described embodiments.

What is claimed is:

1. A safety valve, comprising:
   a first portion, the first portion including a safety valve sub having a sliding sleeve, the first portion configured to be run-in-hole as part of wellbore tubing;
   a second portion, the second portion including a valve closure mechanism and a bore flow management actuator, the bore flow management actuator configured to slide from a first initial state to a first subsequent state to move the valve closure mechanism between a first closed state and a first open state, the second portion configured to be run-in-hole after the first portion; and
   a third portion, the third portion including a mechanical connecting apparatus, the third portion configured to be run-in-hole after the second portion, and further wherein the mechanical connecting apparatus is configured to couple with the sliding sleeve of the first portion and the bore flow management actuator of the second portion to axially fix together the sliding sleeve and at least a portion of the bore flow management actuator.

2. The safety valve as recited in claim 1, wherein the safety valve sub additionally includes an electromagnetic assembly and a magnetic target configured to magnetically couple with the electromagnetic assembly.

3. The safety valve as recited in claim 2, wherein the magnetic target is coupled to the sliding sleeve and the electromagnetic assembly is axially fixed with the wellbore tubing.

4. The safety valve as recited in claim 1, wherein the sliding sleeve includes a sliding sleeve profile and the mechanical connecting apparatus includes an uphole mechanical connecting apparatus profile, and further wherein the uphole mechanical connecting apparatus profile is configured to couple with the sliding sleeve profile to axially fix together the sliding sleeve and the mechanical connecting apparatus.

5. The safety valve as recited in claim 4, wherein the bore flow management actuator includes a bore flow management actuator profile and the mechanical connecting apparatus includes a downhole mechanical connecting apparatus profile, and further wherein the downhole mechanical connecting apparatus profile is configured to couple with the bore flow management actuator profile to axially fix together at least a portion of the bore flow management actuator and the mechanical connecting apparatus.

6. The safety valve as recited in claim 1, wherein the bore flow management actuator includes a flow tube main body and a translating sleeve assembly including a translating sleeve.

7. The safety valve as recited in claim 6, wherein the mechanical connecting apparatus is configured to couple with the sliding sleeve of the first portion and the translating sleeve of the second portion to axially fix together the sliding sleeve and the translating sleeve.

8. The safety valve as recited in claim 6, wherein the second portion further includes a lower valve assembly located proximate the valve closure mechanism and an upper valve assembly positioned distal the valve closure mechanism, and further wherein the bore flow management actuator includes a power spring disposed between the lower valve assembly and a translating sleeve shoulder of the translating sleeve.

9. The safety valve as recited in claim 8, wherein the second portion further includes a nose spring disposed between the translating sleeve assembly and a flow tube shoulder of the flow tube main body.

10. The safety valve as recited in claim 1, wherein the first portion has a first portion minimum inside diameter ($ID_1$) and the second portion has a second portion maximum outside diameter ($OD_2$), and further wherein the second portion maximum outside diameter ($OD_2$) is less than the first portion minimum inside diameter ($ID_1$) such that the second portion is configured to be run-in-hole after the first portion.

11. A well system, comprising:
    a wellbore extending through one or more subterranean formations;
    production tubing disposed in the wellbore; and
    a safety valve disposed in the wellbore, the safety valve including:
    a first portion, the first portion including a safety valve sub having a sliding sleeve, the first portion configured to be run-in-hole as part of the production tubing;
    a second portion, the second portion including a valve closure mechanism and a bore flow management actuator, the bore flow management actuator configured to slide from a first initial state to a first subsequent state to move the valve closure mechanism between a first closed state and a first open state, the second portion configured to be run-in-hole after the first portion; and
    a third portion, the third portion including a mechanical connecting apparatus, the third portion configured to be run-in-hole after the second portion, and further wherein the mechanical connecting apparatus is configured to couple with the sliding sleeve of the first portion and the bore flow management actuator of the second portion to axially fix together the sliding sleeve and at least a portion of the bore flow management actuator.

12. The well system as recited in claim 11, wherein the safety valve sub additionally includes an electromagnetic assembly and a magnetic target configured to magnetically couple with the electromagnetic assembly.

13. The well system as recited in claim 12, wherein the magnetic target is coupled to the sliding sleeve and the electromagnetic assembly is axially fixed with the wellbore tubing.

14. The well system as recited in claim 11, wherein the sliding sleeve includes a sliding sleeve profile and the mechanical connecting apparatus includes an uphole mechanical connecting apparatus profile, and further wherein the uphole mechanical connecting apparatus profile is configured to couple with the sliding sleeve profile to axially fix together the sliding sleeve and the mechanical connecting apparatus.

15. The well system as recited in claim 14, wherein the bore flow management actuator includes a bore flow management actuator profile and the mechanical connecting apparatus includes a downhole mechanical connecting apparatus profile, and further wherein the downhole mechanical connecting apparatus profile is configured to couple with the bore flow management actuator profile to axially together at least a portion of the bore flow management actuator and the mechanical connecting apparatus.

16. The well system as recited in claim 11, wherein the bore flow management actuator includes a flow tube main body and a translating sleeve assembly including a translating sleeve.

17. The well system as recited in claim 16, wherein the mechanical connecting apparatus is configured to couple with the sliding sleeve of the first portion and the translating sleeve of the second portion to axially fix together the sliding sleeve and the translating sleeve.

18. The well system as recited in claim 16, wherein the second portion further includes a lower valve assembly located proximate the valve closure mechanism and an upper valve assembly positioned distal the valve closure mechanism, and further wherein the bore flow management actuator includes a power spring disposed between the lower valve assembly and a translating sleeve shoulder of the translating sleeve.

19. The well system as recited in claim 18, wherein the second portion further includes a nose spring disposed between the translating sleeve assembly and a flow tube shoulder of the flow tube main body.

20. The well system as recited in claim 11, wherein the first portion has a first portion minimum inside diameter ($ID_1$) and the second portion has a second portion maximum outside diameter ($OD_2$), and further wherein the second portion maximum outside diameter ($OD_2$) is less than the first portion minimum inside diameter ($ID_1$) such that the second portion is configured to be run-in-hole after the first portion.

21. The well system as recited in claim 11, wherein the safety valve is a wireline retrievable safety valve (WLRSV), and further including a tubing retrievable safety valve (TRSV) disposed in the wellbore.

22. The well system as recited in claim 21, wherein the tubing retrievable safety valve (TRSV) forms part of the first portion.

23. A method, comprising:

positioning a first portion within a wellbore extending through one or more subterranean formations, the first portion including a safety valve sub having a sliding sleeve;

positioning a second portion within the wellbore after positioning the first portion within the wellbore, the second portion including a valve closure mechanism and a bore flow management actuator, the bore flow management actuator configured to slide from a first initial state to a first subsequent state to move the valve closure mechanism between a first closed state and a first open state, the second portion configured to be run-in-hole after the first portion; and positioning a third portion within the wellbore after positioning the second portion within the wellbore, the third portion including a mechanical connecting apparatus, wherein the mechanical connecting apparatus is configured to couple with the sliding sleeve of the first portion and the bore flow management actuator of the second portion to axially fix together the sliding sleeve and at least a portion of the bore flow management actuator.

24. The method as recited in claim 23, further including coupling the mechanical connecting apparatus with the sliding sleeve of the first portion and the bore flow management actuator of the second portion to axially fix together the sliding sleeve and at least a portion of the bore flow management actuator.

25. The method as recited in claim 23, wherein second portion forms a part of a wireline retrievable safety valve (WLRSV), and further including a tubing retrievable safety valve (TRSV) disposed in the wellbore.

26. The method as recited in claim 25, wherein the tubing retrievable safety valve (TRSV) forms part of the first portion.

27. The method as recited in claim 23, wherein the safety valve sub additionally includes an electromagnetic assembly and a magnetic target configured to magnetically couple with the electromagnetic assembly.

28. The method as recited in claim 27, wherein the magnetic target is coupled to the sliding sleeve and the electromagnetic assembly is axially fixed with the wellbore tubing.

\* \* \* \* \*